US010274735B2

(12) United States Patent
Souchard

(10) Patent No.: US 10,274,735 B2
(45) Date of Patent: Apr. 30, 2019

(54) SYSTEMS AND METHODS FOR PROCESSING A 2D VIDEO

(71) Applicant: Unity IPR ApS, Copenhagen K (DK)

(72) Inventor: Christophe Souchard, Marina Del Rey, CA (US)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 15/842,389

(22) Filed: Dec. 14, 2017

(65) Prior Publication Data

US 2018/0113315 A1 Apr. 26, 2018

Related U.S. Application Data

(63) Continuation of application No. 15/286,410, filed on Oct. 5, 2016, now Pat. No. 9,869,863.

(Continued)

(51) Int. Cl.
*G02B 27/01* (2006.01)
*G06K 9/00* (2006.01)
(Continued)

(52) U.S. Cl.
CPC .......... *G02B 27/0172* (2013.01); *A63F 13/26* (2014.09); *G02B 27/017* (2013.01); *G06K 9/00208* (2013.01); *G06K 9/00671* (2013.01); *G06T 7/246* (2017.01); *G06T 7/579* (2017.01); *H04N 5/23293* (2013.01); *H04N 13/221* (2018.05); *H04N 13/271* (2018.05);
(Continued)

(58) Field of Classification Search
None
See application file for complete search history.

(56) References Cited

U.S. PATENT DOCUMENTS

| 2002/0105484 A1* | 8/2002 | Navab | G02B 27/017 345/8 |
| 2002/0113756 A1* | 8/2002 | Tuceryan | G02B 27/017 345/8 |

(Continued)

OTHER PUBLICATIONS

U.S. Appl. No. 15/286,410, Final Office Action dated Jun. 22, 2017, 14 pgs.

(Continued)

*Primary Examiner* — Hung Q Dang
(74) *Attorney, Agent, or Firm* — Schwegman Lundberg & Woessner, P.A.

(57) ABSTRACT

A system includes one or more hardware processors, a head mounted display (HMD), a digital camera device, and a path extraction engine. The path extraction engine is configured to receive two-dimensional (2D) video from the digital camera device, the 2D video presenting a 2D view of a three-dimensional (3D) object, the digital camera device moving along a camera path as the digital camera device captures the 2D video, identify a plurality of 2D features associated with the 3D object within the 2D video, track the plurality of 2D features across multiple frames of the 2D video, estimate motion in pixels associated with each 2D feature of the plurality of 2D features, using the estimated motion in the pixels, identify 2D motion caused by the digital camera device moving along the camera path, and compute a first camera position of the digital camera device based on the identified 2D motion.

20 Claims, 15 Drawing Sheets

Related U.S. Application Data

(60) Provisional application No. 62/237,358, filed on Oct. 5, 2015.

(51) Int. Cl.
| | | |
|---|---|---|
| *G06T 7/579* | (2017.01) | |
| *G06T 7/246* | (2017.01) | |
| *H04N 5/232* | (2006.01) | |
| *A63F 13/26* | (2014.01) | |
| *H04N 13/344* | (2018.01) | |
| *H04N 13/221* | (2018.01) | |
| *H04N 13/271* | (2018.01) | |
| *G06K 9/68* | (2006.01) | |
| *H04N 13/00* | (2018.01) | |

(52) U.S. Cl.
CPC .... *H04N 13/344* (2018.05); *A63F 2300/6009* (2013.01); *A63F 2300/69* (2013.01); *G02B 2027/014* (2013.01); *G02B 2027/0138* (2013.01); *G02B 2027/0147* (2013.01); *G06K 9/6857* (2013.01); *G06T 2207/30244* (2013.01); *H04N 2013/0081* (2013.01); *H04N 2013/0085* (2013.01)

(56) References Cited

U.S. PATENT DOCUMENTS

| | | | |
|---|---|---|---|
| 2009/0052743 A1 | 2/2009 | Techmer | |
| 2009/0110241 A1 | 4/2009 | Takemoto et al. | |
| 2010/0158482 A1* | 6/2010 | Sikora .................. | G06T 15/205 386/241 |
| 2012/0120199 A1 | 5/2012 | Ben Himane | |
| 2013/0076789 A1* | 3/2013 | Majumder ........... | H04N 9/3147 345/633 |
| 2013/0128121 A1 | 5/2013 | Agarwala et al. | |
| 2013/0155058 A1* | 6/2013 | Golparvar-Fard .... | G06T 19/006 345/419 |
| 2013/0242054 A1* | 9/2013 | Chiu ..................... | G06T 17/00 348/46 |
| 2014/0160244 A1* | 6/2014 | Berberian .......... | G06K 9/00798 348/46 |
| 2015/0036888 A1 | 2/2015 | Weisenburger | |
| 2015/0145965 A1* | 5/2015 | Livyatan ................. | B60R 1/00 348/47 |
| 2016/0005184 A1 | 1/2016 | Theodorakopoulos et al. | |
| 2016/0028967 A1 | 1/2016 | Sezer et al. | |
| 2016/0071238 A1 | 3/2016 | Kimura | |
| 2016/0117569 A1 | 4/2016 | Desappan et al. | |
| 2016/0283774 A1* | 9/2016 | Buchanan ............ | G06K 9/0063 |
| 2017/0098312 A1 | 4/2017 | Souchard | |

OTHER PUBLICATIONS

U.S. Appl. No. 15/286,410, Non Final Office Action dated Dec. 29, 2016, 11 pgs.

U.S. Appl. No. 15/286,410, Notice of Allowance dated Sep. 7, 2017, 5 pgs.

U.S. Appl. No. 15/286,410, Response filed Aug. 22, 2017 to Final Office Action dated Jun. 22, 2017, 11 pgs.

Hu, et al., "Long Image Sequence Motion Analysis Using Polynomial Motion Models", MVA 92 IAPR Workshop on Machine Vision Applications, Tokyo,, (Dec. 7-9, 1992), 109-113.

Jiang, et al., "Extendible Tracking by Line Auto-Calibration", IEEE and ACM International Symposium on Augmented Reality (ISAR '01), 97-106, 200.

* cited by examiner

SYSTEMS AND METHODS FOR PROCESSING A 2D VIDEO

RELATED APPLICATIONS

This application is a continuation of and claims the benefit of priority under 35 U.S.C. § 120 to U.S. patent application Ser. No. 15/286,410, filed on Oct. 5, 2016, which claims the benefit of priority to U.S. Provisional Patent Application Ser. No. 62/237,358, filed Oct. 5, 2015, each of which is herein incorporated by reference in its entirety.

TECHNICAL FIELD

Some embodiments of the present disclosure relate generally to computer graphics and, more specifically, to systems and methods for extracting a camera path from a 2-dimensional video.

Some embodiments of the present disclosure relate generally to computer graphics and, more specifically, to systems and methods for extracting 3-dimensional objects from a 2-dimensional video.

Some embodiments of the present disclosure relate generally to computer graphics and, more specifically, to systems and methods for integration and manipulation of 3-dimensional objects in a 2-dimensional video.

BACKGROUND

In recent years, the emergence of technologies such as augmented reality (AR) and wearable computing devices such as optical head-mounted displays (OHMD) has allowed users to experience views of their surroundings with supplemental or additional information added to the experience. These devices and other sources may generate 2-dimensional video, such as through a digital camera device.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used. Like numbers in the Figures indicate like components.

DETAILED DESCRIPTION

Figure 1:
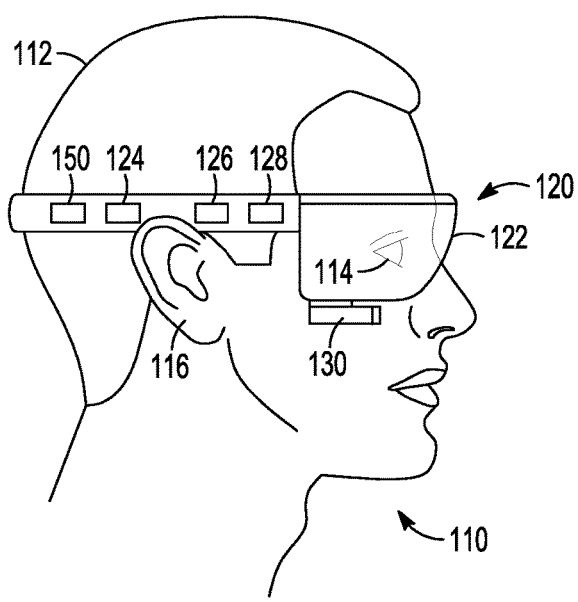
FIG. 1 illustrates an example environment including an optical head-mounted display (OHMD) device (or "OHMD system") shown in a mounted configuration on a head of a wearer (or "user").

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some augmented reality applications, a live video feed is captured from a camera device, providing an input video feed. This 2-dimensional (2D) video then has additional information or data added to it before or while being displayed to a user, thereby augmenting the 2D video with additional data to provide the user with an enhanced viewing experience.

Some optical head-mounted display (OHMD) devices, such as Google Glass and Microsoft HoloLens, are wearable computing devices that the user mounts on their head, and near or over their eyes. These OHMD devices typically provide the user with one or more semi-transparent lenses through which the user views their "real-world" surroundings. In addition, these lenses also serve as display surfaces on which additional data can be displayed. This additional data can include 3D objects displayed within the user's view such that these objects blend in with the real-world surroundings in a realistic manner. In order to add 3D objects into the display such that the 3D objects appear to interact properly with respect to the real environment, knowledge of the camera's path throughout the environment is desirable.

A video processing system and methods are described herein. In some embodiments, the video processing system includes a camera path extraction engine configured to extract a camera path from a 2-dimensional (2D) video. In some embodiments, the video processing system includes a 3-dimensional (3D) object extraction engine configured to extract a 3D object from a 2D video. In some embodiments, the video processing system includes an integration engine configured to integrate 3D objects into and manipulate 3D objects within a 2D video.

A path extraction engine and methods for extracting a camera path from a 2D video are described herein. The path extraction engine receives 2D video (e.g., a series of digital images) captured from a perspective of a video source (e.g., a digital camera, or just "source camera") as it moves through 3-dimensional (3D) space (the "camera trajectory" or "camera path"). The trajectory of the source camera may include translational motion (e.g., movement of the camera in a 3D Cartesian x, y, and z space), rotational motion (e.g., angling of the FOV of the camera in any of three rotational axes), and sometimes focal length of the camera as it captures the 2D video. The path extraction engine estimates this camera trajectory by analyzing the 2D video over a series of frames, identifying "strong features" such as edges of objects, tracking those strong features over the series of frames, and determining the 3D motion of the camera from the motion of these strong features. In some embodiments, a known image (e.g., a "reference image") is present in the scene, and the strong features are extracted using the reference image. In some embodiments, the reference image may be added to the scene (e.g., for purposes of using the reference image for camera path extraction). In other embodiments, the path extraction engine may recognize the reference image within the scene (e.g., a company logo printed on a surface of an object in the scene), separately analyze another copy of the reference image (an "ideal image," e.g., the company's logo image), and extract strong features for the ideal image. These strong features for the ideal image may then be used to analyze the scene.

In one example embodiment, a user or "wearer" wears a head-mounted display (HMD) computing device (e.g., on their head). The HMD includes various computing components including at least one processor (e.g., a central processor, a graphics processor, and so forth), a visor or lens (e.g., an OHMD-type device having transparent or semi-transparent plastic or glass mountable over the wearer's eyes, and through which the wearer views, inter alia, the real world, or an opaque visor presenting a non-transparent surface with one or more display surfaces), a display device (e.g., a projection device able to render graphics upon the interior surface of the visor), a digital camera device (e.g., the source camera, mounted so as to capture a portion of the wearer's field of view), and the path extraction engine (e.g., as a dedicated hardware component or software module of the HMD device).

The HMD device presents an "augmented reality" or "mixed reality" environment to the wearer. In some embodiments, the wearer may be able to view the real world through the transparent or semi-transparent lens of the device (e.g., in OHMD embodiments), while at the same time their view of the real world may be augmented by additional data or images displayed on the interior surface of the lens by the embedded display device. In other words, the interior of the lens acts as a display surface, while the wearer also sees the real world. In other embodiments, the real-world view may be presented to the wearer via an opaque visor of the HMD (e.g., captured via a camera device), while augmenting the real-world view is augmented with the additional data or images.

During operation of the HMD device, the source camera captures 2D video as the user (and camera) moves through 3D ("real world") space (e.g., causing translation of the camera) and perhaps changes the angle at which their head is oriented (e.g., causing rotation of the camera). Further, in some embodiments, the camera also captures depth information (e.g., from a camera capturing depth information, such as RGB+D). For example, the wearer may walk around a table, all the time keeping the table approximately centered within the camera's view. As such, the camera captures 2D video of the table from many different perspectives. The 2D video can be thought of and discussed as a sequence of still images.

As the wearer walks, the camera may capture, for example, 30 frames per second of operation. The path extraction engine receives this 2D video from the camera and processes the sequence of frames as the wearer moves around the table. More specifically, the path extraction engine determines strong features of the table and other objects appearing in the video, such as, for example, corners and edges of the table. These strong features are the tracking candidates used for a path extraction process. Many features may be identified within the 2D video frames, such as approximately 20 features. A spatial frequency filter is used to determine the features, and a set of pixels corresponding to each of these features ("feature pixels"), collectively referred to herein as "feature information". These sets of feature pixels are determined by using spatial derivatives and using a scoring methodology for selection.

Each of these chosen features is then tracked over time (e.g., from frame to frame) to obtain a 2D trajectory of the features. An optical flow of the pixels related to the chosen features is calculated to determine 2D trajectories of the various features (additional "feature information" for each feature). The feature information for all of the features is then used to extract the dominant 2D motion caused by the 3D camera movement. With the 2D trajectory, the path extraction engine then estimates the 3D trajectory of the camera. Once the 3D motion of the camera is estimated, then a triangulation technique may be used to estimate the depth (e.g., in the camera's 3D space) of some or all of the pixels related to the features. In embodiments using a reference image (e.g., placed on object within the scene, such as the table), the path extraction engine determines strong features in the reference image appearing in the video, such as, for example, corners and edges of the object. The reference image may be analyzed prior to placement or detection within the scene wherein the strong features are extracted. The strong features from the prior analysis are compared with the strong features extracted from the scene and are used as the tracking candidates for a path extraction process.

In the example embodiment, this camera trajectory is used to update the camera pose (e.g., in real time, or contemporaneously with the user's experience with the wearable device). The camera trajectory may be used to add digital content to the captured real-world images. In some embodiments, this camera trajectory may be used to generate an animation clip or curve for a game engine to use at a later time. In some embodiments, the camera trajectory may be computed and used in real time (e.g., contemporaneously as a user views the real world), or not in real time, (e.g., based on a previously captured 2D video).

A 3D object extraction engine and methods for extracting 3D objects from a 2D video are described herein. The object extraction engine uses the 2D video and the camera trajectory (e.g., as computed above) to build a (virtual) 3D object of real-world objects ("target objects") captured in the 2D video. The optical flow is calculated for all pixels in each frame. The optical flow and the camera path are used to calculate the depth using a linear set of equations and solving for the depth, z.

A depth of each pixel is computed by the object extraction engine for each frame using the optical flow for the pixels and the camera path trajectory. As such, for each frame, the object extraction engine thus computes a depth map for the pixels of that frame. Target objects often appear in successive frames within such 2D video. As the camera moves through the 3D environment, the target objects are often seen from many angles, and over many frames. The depth maps of each frame thus provide multiple distance estimates from the camera (e.g., from the camera path in the 3D environment) to a particular point or spot on the target object. The object extraction engine uses the depth maps and feature boundaries to construct surface(s) of the target object(s), and the multiple depth or distance estimates over many frames improve the accuracy of any single depth estimate since they lead to multiple estimates for the same point(s).

Further, since the source 2D video includes color information for each pixel, the depth map is also a colored depth texture map of each frame. The depth map is a surface that does not have individual objects, but rather is one surface with different depths. The object extraction engine, thus, analyzes this colored depth map and carves out 3D objects. For example, if there is a globe of the Earth in the 2D video, and if enough of the globe is captured in the video, then the globe may be extracted as a 3D volumetric object with color, where the globe is defined in part by the pixel depths that delineate its volume.

In many cases, the entirety of an object may not be seen in the 2D video. As such, the object extraction engine extracts partial objects or surfaces from the depth map. For example, a table may appear in the 2D video, but the 2D video may only show one or two front legs of the table (e.g., where the other legs may be hidden from view by the tabletop). Even though the entire structure of the table is not visible in the 2D video, the top of the table presents a large flat area (e.g., surface) regardless of whether the 2D video includes the legs. Accordingly, the object extraction engine recognizes the table's surface without necessarily defining the entire object as a table.

An integration engine for integrating and manipulating 3D objects in 2D video is described herein. In one embodiment, the integration engine uses the depth map of the 2D video (e.g., generated by the 3D object extraction engine described above) to integrate other 3D objects into the 2D video. The depth map and objects that are extracted from the depth map provide an environment into which the integration engine may introduce other 3D objects. For example, since the table is an extracted, independent object (e.g., having known depths or distances from the camera provided by the depth map), the integration engine may introduce a 3D object onto the surface of the table, such as a flower vase or a dining plate. As such, the newly introduced 3D object can interact with the table in other ways, such as by lighting effects (e.g., casting a shadow) or by physics effects (e.g., rolling across the surface).

In another embodiment, the integration engine uses the depth map to manipulate or modify objects already within the depth map. For example, the table may have a circular table leg visible within the 2D video and included within the depth map. The integration engine may manipulate or change the table leg through altering the depth values of the object. For example, the integration engine may "push" or "pull" (e.g., lengthen or shorten) pixel depths associated with the table leg so as to make the leg square rather than circular. Since a pixel in one frame corresponds to a point on an object, a change in depth for a pixel in one frame may affect all the depth values for the same object point in other frames.

FIG. 1 illustrates an OHMD device (or "OHMD system") 120 shown in a mounted configuration on a head 112 of a wearer (or "user") 110. In the example embodiment, the OHMD device 120 includes a transparent or semi-transparent visor (or "lens", or "lenses") 122 through which the wearer 110 may view their surroundings (also herein referred to also as "the real world", or an "environment"). In other embodiments, the OHMD device 120 may include an opaque visor 122 which may obscure the wearer 110's view of the real world, but may present the wearer 110 a view of their surroundings via input from a digital camera device 130. The OHMD device 120 also includes a display device 128 that renders graphics (e.g., digital images) on the visor 122. In some embodiments, the display device 128 projects images onto the visor 122. As such, the visor 122 acts as a "screen" or surface on which the output of the display device 128 appears.

The display device 128 is driven or controlled by one or more graphics processing units (GPUs) 126. The GPU 126 processes aspects of graphical output that assists in speeding up rendering of output through the display device 128. The OHMD device 120 also includes a central processor 124 that may execute some of the operations and methods described herein.

In the example embodiment, the OHMD device 120 also includes the digital camera device 130 and one or more graphics processing engines 150 that may be used for extracting a camera path from 2D video, extracting 3D objects from the 2D video, and/or integrating objects into or manipulating objects within the 2D video, as described herein. The digital camera device (or just "camera") 130 is a forward-facing video input device that is oriented so as to cover at least a portion of a field of view (FOV) of the wearer 110. In other words, the camera 130 captures or "sees" an angle of view of the real world based on the orientation of the OHMD device 120 (e.g., similar to what the wearer 110 sees in the wearer 110's FOV when looking through the visor 122). In some embodiments, output from the digital camera device 130 may be projected onto the visor 122 (e.g., in opaque visor embodiments), and may also include additional digital content (e.g., added to the camera output).

In the example embodiment, the camera 130 operates to capture a series of digital images, or "frames". One operational characteristic of the camera 130 is the number of frames captured per second of operation, referred to herein as the "frame rate" of the camera 130 (e.g., 30 frames per second, or 60 frames per second). Another operational characteristic of the camera 130 is the definition or resolution, referring to the amount of detail in each frame (e.g., as a number of pixels, a number of lines, and so forth). These operational characteristics may be embodied in common standards such as "standard definition" (e.g., <480 horizontal lines), "high definition" (e.g., 720p, 1080i), or "ultra high definition" (e.g., 2160p, 4320p). Any such characteristics of the camera 130 that enable the systems and methods described herein may be used. Further, any such resulting 2D video specifications that enable the systems and methods described herein may be used. In some embodiments, analog video may be captured by the camera 130 and converted to digital format using known methods.

In the example embodiment, the camera 130 is a "depth camera," sometimes referred to as a "depth-sensing camera." In addition to digital video, depth cameras also capture depth information during operation, or a linear distance from the camera to real-world objects. To capture such information, the camera 130 includes one or more depth sensors (not separately shown), such as an infrared sensor. The depth information may be captured on a per-pixel basis such that, for example, each pixel within the frame may include depth information indicating a distance from the camera to a real-world surface or point associated with that particular pixel. For example, the digital video captured by depth cameras may be in a format referred to as "RGB+D", or Red/Green/Blue (e.g., for the color of a pixel) plus Depth information (e.g., for the depth of that pixel). The depth camera may provide two streams of data: (1) color video (e.g., in RGB); and (2) depth information (e.g., a depth map captured by an infrared sensor). As such, this type of digital video from a depth camera may be referred to herein as "2D video with depth information", and such embodiments may be referred to herein as "depth information embodiments".

During operation, the OHMD device 120 is mounted over both eyes 114 of the wearer 110, as shown in FIG. 1. In the example embodiment, the wearer 110 is able to view their surroundings through the transparent or semi-transparent visor 122, with the wearer 110 having an FOV based on the orientation of their head 112 and eyes 114. Further, the camera 130 operates to capture a "live" digital video (sometimes referred to herein as "the source video") as the wearer 110 operates the OHMD system 120. The digital video is sent from the camera 130 to one or more of the graphics processing engines 150 as it is captured. In some embodiments, one of the graphics processing engines 150 processes the digital video to determine a path of the camera 130 (e.g., and of the wearer 110, in this embodiment) through real-world, 3D space based on the 2D video captured by the OHMD device 120 in real time. In other words, the graphics processing engine 150 determines, or "extracts", from the 2D video (and optionally depth information), the approximate position of the camera 130, or the "camera path," as the camera 130 moves through the real world over the timeframe that the digital video is captured. In other embodiments, the path of a camera capturing 2D video may similarly be determined from the 2D video (e.g., not in real time, or captured by another camera not necessarily attached to the OHMD 120). In some embodiments, one of the graphics processing engines 150 extracts 3D objects from the 2D video (and optionally depth information) and the camera path as the camera 130 moves through the real world over the timeframe during which the digital video is captured. In some embodiments, one of the graphics processing engines 150 integrates 3D objects into and/or manipulates objects extracted from the 2D video.

The above-described embodiments involving a wearable computing device such as the OHMD device 120 are said to operate in "real time" (e.g., contemporaneously with "live-action" or "streaming" video from the camera 130). Such embodiments are referred to herein as "real-time camera path extraction", or "real-time 3D object extraction", or "real-time object integration or manipulation", or simply "realtime" embodiments. It should be understood that other devices may be used to perform real-time camera path extraction. For example, a smartphone having an integrated camera similar to the camera 130 may be used in lieu of the OHMD device 120, and the graphics processing engine(s) 150 may operate similarly to determine the camera path of the smartphone, or extract 3D objects, as digital video is captured. With some computing devices, processing power may be limited. As such, camera path extraction may be more computationally feasible in real time with the use of a depth camera.

Further, "offline" embodiments are possible as well. For example, a source video may be captured by a digital camera similar to the camera 130, or a traditional digital camera (e.g., without depth information), and processed at a later point in time (e.g., not in real-time). Such embodiments are referred to herein as "offline camera path extraction", or "offline 3D object extraction", or "offline 3D object integration or manipulation", or simply "offline" embodiments. In some computing environments, processing camera path extraction and/or 3D object extraction or integration as described herein may be more computationally feasible in an offline environment. For example, offline embodiments may include adding 3D objects by users into a previously-captured 2D video, for example for entertainment or artistic purposes. For another example, offline embodiments may include creating an animation curve that may be used by a game engine, where the game may be fixed along the animation curve. High-performance computers (e.g., greater than may be possible onboard the OHMD device 120) may be used for certain applications.

While the examples shown and described herein are illustrated with respect to an OHMD device 120, it should be understood that many of the systems and methods described herein may be applied to an opaque HMD device.

Figure 2:
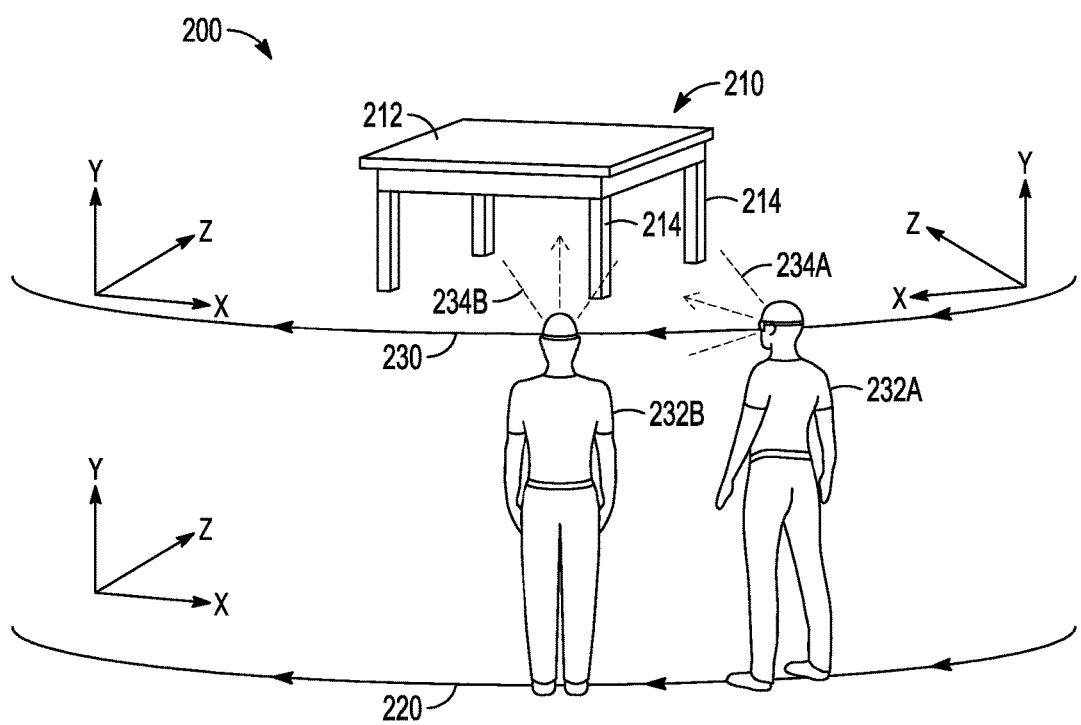
FIG. 2 is an illustration of the wearer moving through a real-world environment (e.g., in 3-dimensional (3D) space) while wearing the OHMD device shown in FIG. 1.

FIG. 2 illustrates the wearer 110 moving through a real-world environment 200 (e.g., in 3D space) while wearing the OHMD device 120. In the example embodiment, the wearer 110 is wearing and operating the OHMD device 120 (not separately numbered in FIG. 2) as the wearer 110 traverses a route 220 through the environment 200. As illustrated in FIG. 2, the route 220 is traversed (e.g., walked) by the wearer 110 around or near a table 210. The table 210 includes a table surface 212 and multiple table legs 214.

In the example embodiment, as the wearer 110 walks the route 220 (e.g., from the side to the front of the table 210), the OHMD device 120 captures digital video ("source video") based on the route 220 walked by the wearer 110 (e.g., from the side to the front of the table 210) and the orientation of the head 112 of the wearer 110 (e.g., the FOV through the visor 122, which influences the orientation of the camera 130). More specifically, the camera 130 traverses a path (a "camera path") 230 as the wearer 110 moves through the environment 200. This camera path 230 may include a position of the camera 130 in 3D space, and may also include an orientation of the camera 130 (e.g., in three axes of rotation).

The wearer 110 is illustrated in FIG. 2 at two points 232A and 232B along the route 220. At each point 232A, 232B, the wearer 110 and the camera 130 experiences a field of view (FOV) 234A and 234B, respectively, of the environment 200, where each FOV 234A, 234B is based on the camera path 230. In the example shown here, the wearer 110, at the point 232A, has an angled FOV 234A of a side of the table 210, whereas at the point 232B, the wearer 110 has a more frontward FOV 234B of the table 210. Similarly, as the wearer 110 changes their FOV 234A, 234B, so too does the camera 130 experience a similar FOV. As such, the FOVs 234A and 234B may be used to refer to either or both of the views from the perspective of the wearer 110 or of the camera 130. Further, as the wearer 110 moves along the route 220 (e.g., from the point 232A to the point 232B), the wearer 110 re-orients their FOV relative to the table 210. In other words, and as shown in FIG. 2, the wearer 110 keeps the table 210 approximately centered in the FOVs 234A, 234B as the wearer 110 moves from point 232A to point 232B (e.g., by rotating their head 112, and OHMD device 120, as they move). It should be noted that, while in this example, the wearer 110 happens to maintain the table 210 approximately centered in the video, this is not required for the functioning of the systems and methods described herein, but is instead provided for purposes of discussion.

The camera 130 captures digital video of the environment 200 at, for example, 30 frames per second as the wearer 110 moves along the route 220, and as the OHMD 120 traverses the camera path 230. The source video, as such, may be described as a sequence of static frames. In the example shown in FIG. 2, the point 232A represents a first point in time at which a first frame is captured, and the point 232B represents a subsequent point in time at which a second, subsequent frame is captured (e.g., the next frame in the sequence). It should be understood that the distance between points 232A and 232B is exaggerated in FIG. 2 for purposes of illustration. In other words, the speed of the wearer 110 (e.g., walking or running speed) as compared to the frame rate of the camera 130 (e.g., 30 frames per second, or 1 frame captured every $1/30^{th}$ of a second) would have point 232B (the point at which the next frame is captured $1/30^{th}$ of a second after the frame captured at the point 232A) much closer to point 232A than shown in FIG. 2.

As mentioned above, the wearer 110 moves along the route 220 as the camera 130 captures the source video along the camera path 230. At any point (e.g., 232A, 232B), the positioning of the camera may be described in terms of a location (e.g., in 3-dimensional space) and an orientation (e.g., in 3 axes of rotation). As such, the camera path 230 may be described in terms of a location or position of the camera 130, an orientation of the camera 130, or both, at a sequence of points in time.

The term "actual camera path", as used herein, may be used to refer to the true path of the camera 130 (e.g., actual location and orientation of the camera 130 as the wearer 110 moves through the environment 200), and the term "estimated camera path" may be used to refer to a computed or approximate path (e.g., estimated location and orientation of the camera 130) based on computational analysis by the graphics processing engine 150 of the source video (e.g., as captured by the camera 130), as described herein. In other words, the camera 130 experiences an actual camera path 230 as the wearer 110 moves through the environment 200, and the graphics processing engine 150 computes an estimated camera path of the camera 130 based on analysis of the source video, where the estimated camera path is an approximation of the actual camera path 230. The term "camera path" may be used, for purposes of convenience, to refer to either the actual camera path or the estimated camera path, depending on context. The process for extracting the camera path 230 (e.g., the estimated camera path) from the source video is described in greater detail below with respect to FIGS. 3A-5E. Further, many of the examples provided herein are described in a real time context, where, for example, the graphics processing engine 150 is operating on 2D video as it is being captured (e.g., as the wearer 110 walks through the environment 200). However, it should be understood that many of the camera path extraction systems and methods described herein may be performed not in real time, such as on a 2D video file previously captured, and may be performed on 2D video from sources other than the OHMD 120.

Figure 3A:
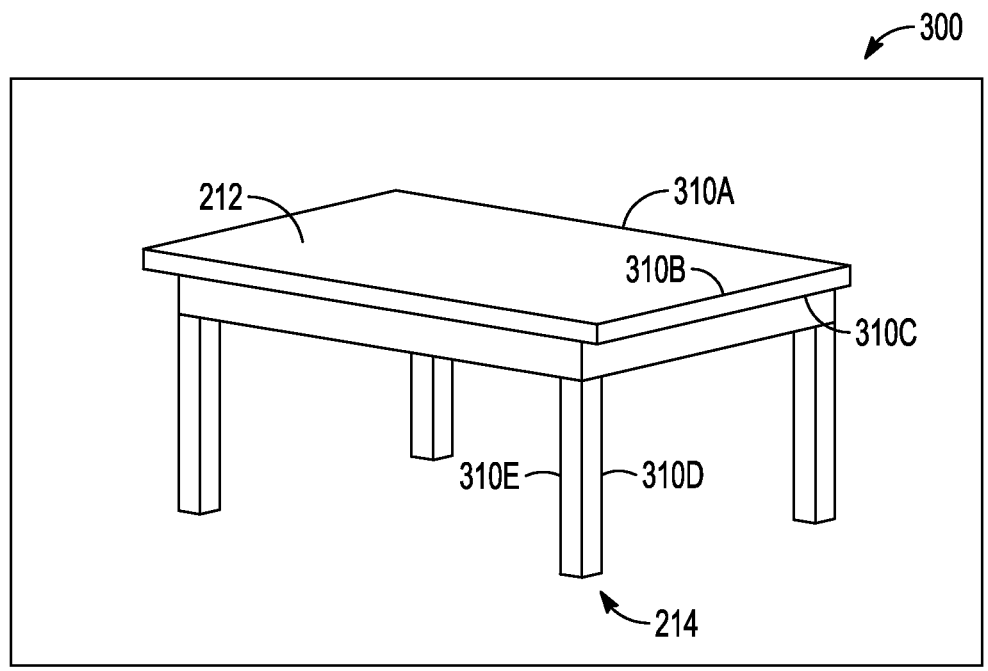
FIG. 3A is a first frame (e.g., a static image) of a source video captured at the first point shown in FIG. 2 by the camera of the OHMD device shown in FIG. 1.
Figure 3B:
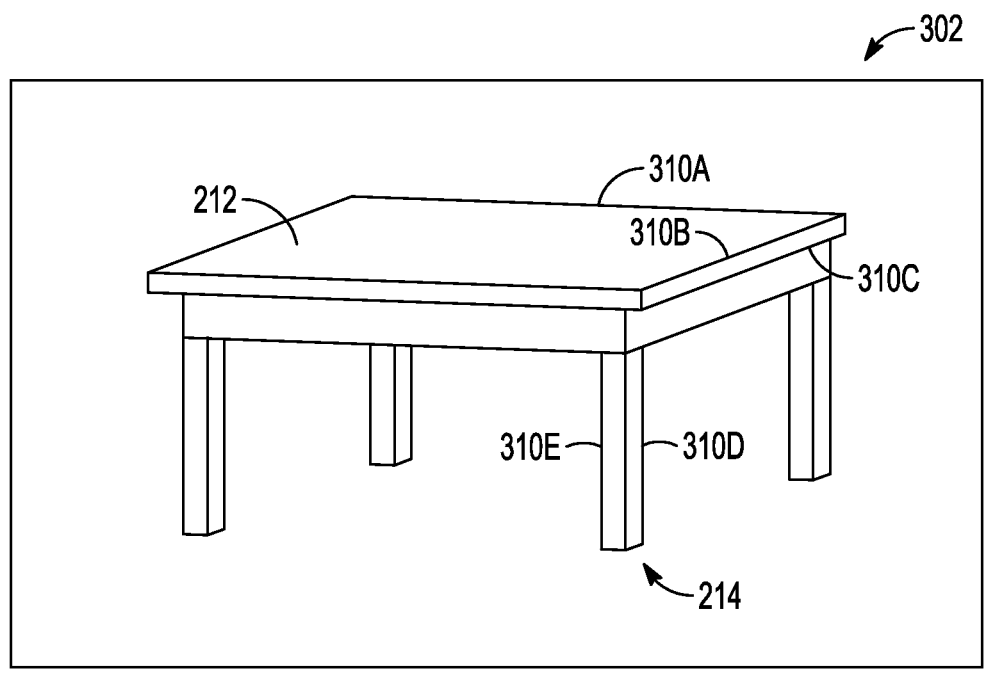
FIG. 3B is a second frame, or the next frame (e.g., another static image), of the source video captured at the second point shown in FIG. 2.

FIG. 3A illustrates a first frame 300 (e.g., a static image) of the source video captured at the point 232A by the camera 130 of the OHMD device 120. FIG. 3B illustrates a second frame 302, or the next frame (e.g., another static image), of the source video captured at the point 232B. In the example embodiment, these two frames 300, 302 represent two sequential frames in a series of frames of the source video that may be preceded by one or more preceding frames (not shown). For example, the second frame 302 is taken at a time $t_n$, the first frame 300 is taken at a time $t_{n-1}$, and previous frames are taken at times $t_{n-2}$ to $t_{n-x}$.

In the example embodiment, the first frame 300 captures an image of the table 210 from, like the point 232A, a more angled perspective than the second frame 302 which, like the point 232B, has a more frontward perspective of the table 210. The frames 300, 302 shown in FIGS. 3A and 3B, like the points 232A, 232B shown in FIG. 2, are exaggerated in the amount of angle change from the first frame 300 to the second frame 302 for purposes of illustration (e.g., to make the change more visually obvious). It should be understood that the actual change from one frame to the next is influenced by the distance moved by the camera 130 in the time the camera 130 takes to capture the next frame (e.g., based on the frame rate of the camera 130).

In the example embodiment, the frames 300, 302 are digital images comprising a matrix of pixels (e.g., in a number of rows and a number of columns, as defined by the resolution of the camera 130). In some embodiments, each pixel is represented as binary values for each of red, green, and blue (e.g., RGB color model). Further, in depth information embodiments (e.g., RGB+D), each pixel may also include depth information as described above. Depth maps may be provided as a separate data channel, and may be provided as a luminance image, where the depth of each pixel from the camera 130 is shown as a brightness value. Brighter pixels often mean that the object represented by the pixel is closer to the camera 130, but the reverse convention may also be used. In addition, there are some conventions in which the depth is measured from a focal plane rather than from the camera 130. Depth data with any of these conventions may be used with the systems and methods described herein.

In the example embodiment, these frames 300, 302 and other frames (not shown) of the source video are analyzed by the graphics processing engine 150 to determine or estimate the camera path 230 in 3D space (e.g., of the environment 200) by using features of objects within the 2D video (e.g., the table 210 within the 3D space), or to extract 3D objects from the 2D video, or to integrate 3D objects into or manipulate objects within the 2D video. More specifically, the graphics processing engine 150 identifies strong features within the frames 300, 302, such as edges 310A, 310B, and 310C of the table surface 212 and edges 310D and 310E of the table leg(s) 214 (all collectively referred to as "strong features"). The identification and use of these features in determining the camera path 230 is described in greater detail below.

Figure 4A:
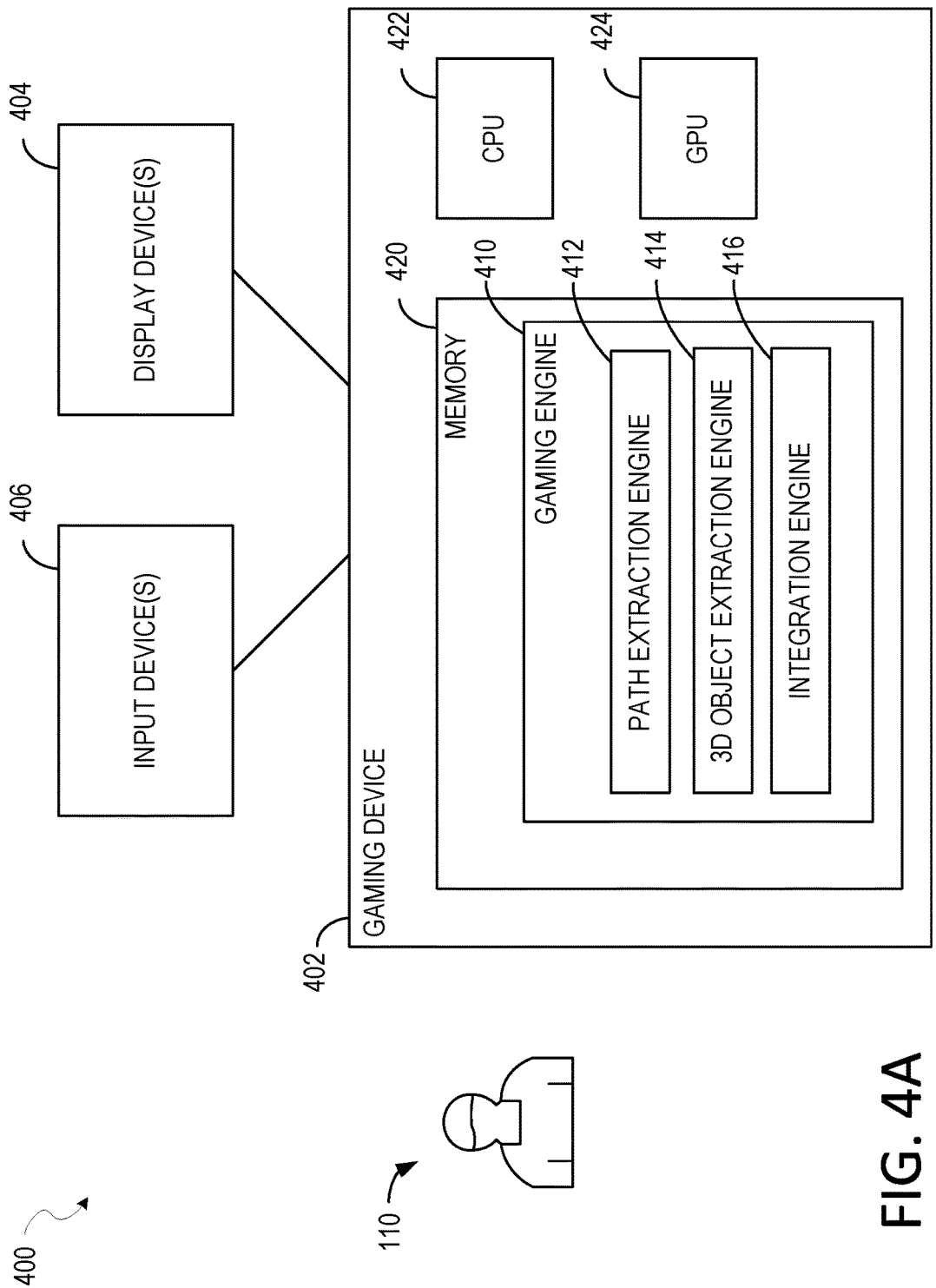
FIG. 4A is a component diagram of an example video processing system 400 that includes components similar to the OHMD shown in FIG. 1.

FIG. 4A is a component diagram of an example video processing system 400 that includes components similar to the OHMD 120 shown in FIG. 1. In the example embodiment, the video processing system 400 includes a gaming device 402, one or more display devices 404 (e.g., the visor 122), and one or more input devices 406 (e.g., the camera 130). The gaming device 402 includes a memory 420, one or more CPUs 422, and one or more GPUs 424. In some embodiments, the CPUs 422 may be similar to the central processor 124, the GPUs 424 may be similar to the GPU 126, the display devices 404 may be similar to the visor 122 or the display device 128, and the gaming device 402 may be a part of the OHMD 120.

In the example embodiment, the gaming device 402 includes a gaming engine 410, executed by the CPU 422 or GPU 424, that processes 2D video as described herein. The gaming engine 410 includes a path extraction engine 412, a 3D object extraction engine 414, and an integration engine 416, each of which are implemented within, or otherwise in communication with, the gaming engine 410. In some embodiments, the gaming device 402 captures 2D video via a digital camera. Each of the path extraction engine 412, the 3D object extraction engine 414, and the integration engine 416, as well as the gaming engine 410 include computer-executable instructions residing in the memory 420 that are executed by the CPU 422 or the GPU 424 during operation. The gaming engine 410 communicates with the display devices 404 and also with other hardware such as the input device(s) 406 (e.g., the camera 130). The path extraction engine 412, the 3D object extraction engine 414, and the integration engine 416, may be integrated directly within the gaming engine 410, or may be implemented as an external piece of software (e.g., a plugin or other independent video processing software).

In the example embodiment, the path extraction engine 412 is configured to extract a camera path from a 2-dimensional (2D) video, the 3D object extraction engine 414 is configured to extract a 3D object from a 2D video, and the integration engine 416 is configured to integrate 3D objects into and manipulate 3D objects extracted from a 2D video. Operation of each of the path extraction engine 412, the 3D object extraction engine 414, and the integration engine 416 is described in greater detail below.

Figure 4B:
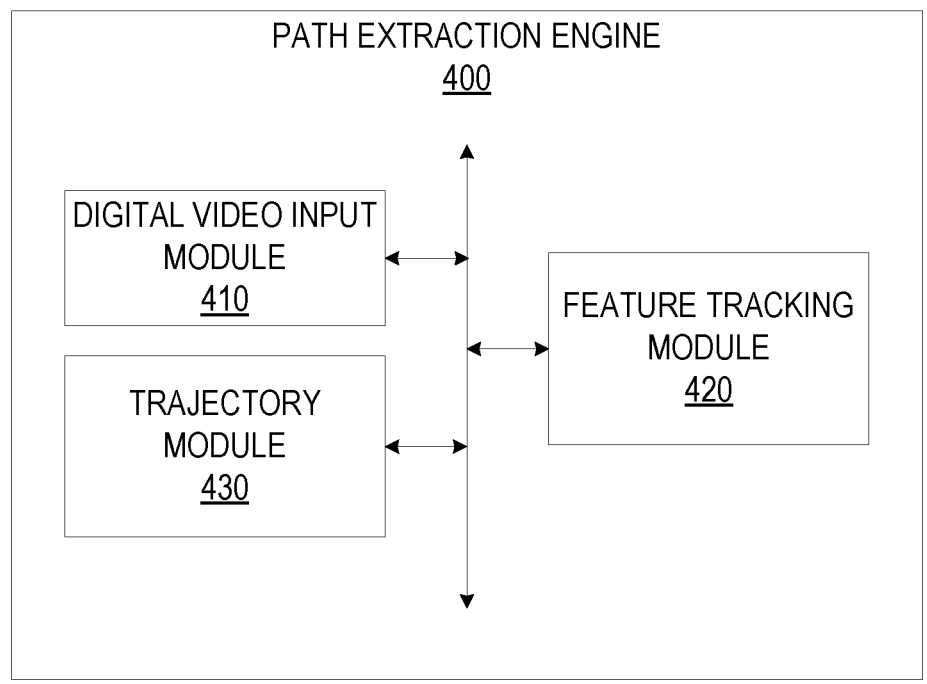
FIG. 4B is a block diagram showing components provided within the path extraction engine according to some embodiments.

FIG. 4B is a block diagram showing components provided within the path extraction engine 412, according to some embodiments. The path extraction engine 412 may be a part of a mobile computing device such as the OHMD device 120, or may be on a desktop device (e.g., personal computer or server machine(s) (not shown)) or a server device (e.g., a cloud server), and may be similar to the graphics processing engine 150.

The path extraction engine 412 includes a digital video input module 410, a feature tracking module 420, and a trajectory module 430. The modules themselves are communicatively coupled (e.g., via appropriate interfaces) to each other and to various data sources, so as to allow information to be passed among the modules, or so as to allow the modules to share and access common data. The digital video input module 410 receives the source video into the path extraction engine 412. As described herein, the source video may come from the camera 130 (e.g., as RGB+D), or the source video may be transmitted or otherwise communicated to the digital video input module 410 (e.g., as RGB). The source video is provided to the feature tracking module 420, which identifies features within the frames of the source video. The feature tracking module 430 also tracks the motion of the identified features over the frames of the source video and determines aspects of 2D motion. The trajectory module 430 then determines a 3D trajectory of the source camera (e.g., the camera 130) based on the 2D motion analysis of the source video to generate a camera path for the source camera through 3D space. The specific operations performed by the path extraction engine 412 are described in greater detail below with respect to FIGS. 5A-5E.

Figure 5A:
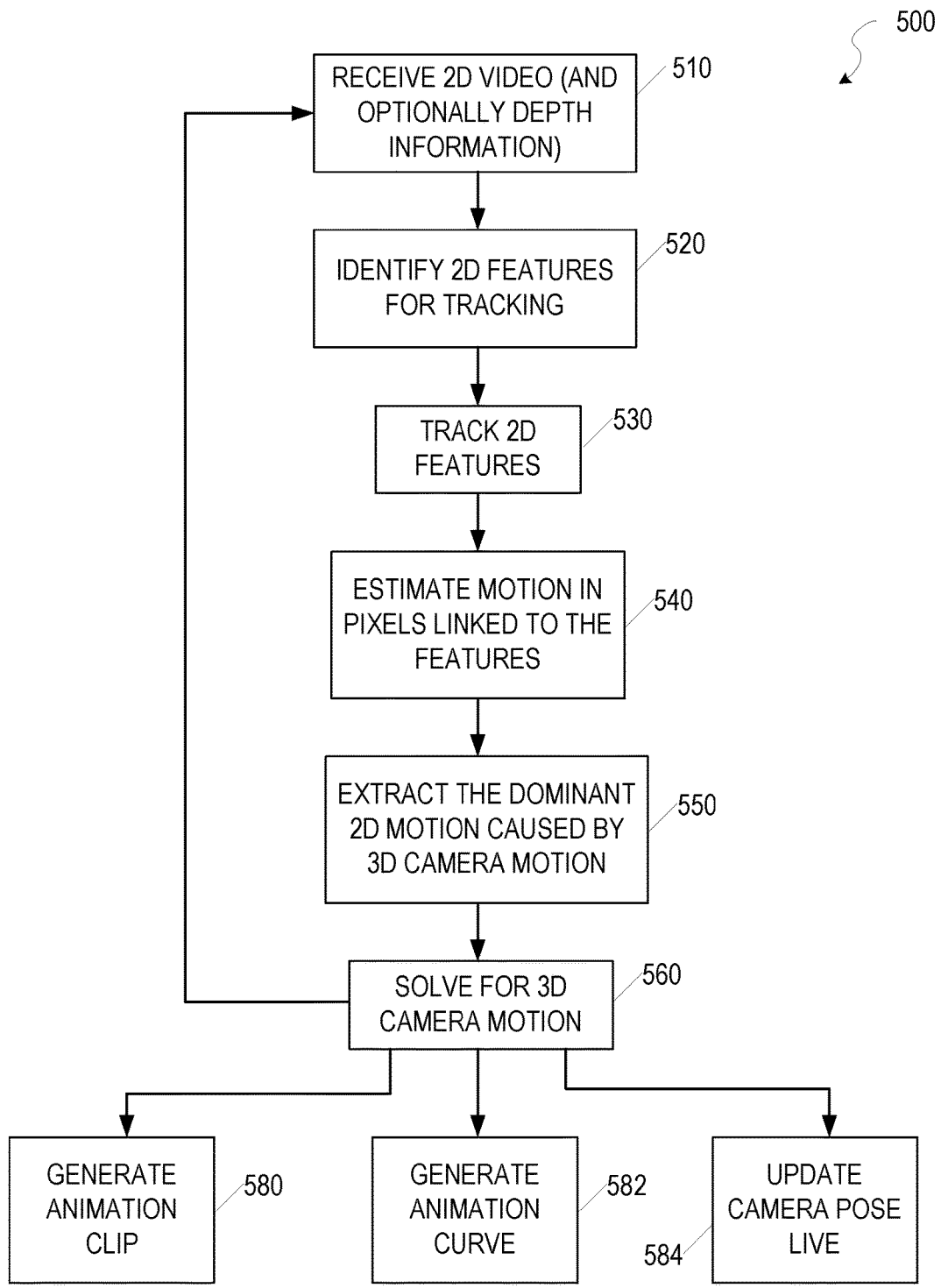
FIG. 5A is a flowchart of a method for camera path extraction performed on the source video captured by the OHMD shown in FIG. 1 in the environment shown in FIG. 2.

FIG. 5A is a flowchart of a method 500 for camera path extraction from 2D video, such as the digital video captured by the OHMD device 120 shown in FIG. 1 in the environment 200 shown in FIG. 2. In the example embodiment, the method 500 is performed by the path extraction engine 412, operating as a part of the OHMD device 120. More specifically, the camera route 220 is extracted from the source video captured in the environment 200 by the camera 130 in a real-time camera path extraction embodiment. In other embodiments, the method 500 is performed in an offline camera path extraction embodiment (e.g., using a desktop computing device or a server device, and not necessarily contemporaneously with the capture of the source video).

In the example embodiment, the path extraction engine 412 performs the method 500 as a moving average based on a window of frames. In other words, the method 500 is performed for one frame at a time, and using the window of frames, including the current frame. The method 500 may use several initial frames of a 2D video to initiate the process. In real time embodiments, the 2D video is regularly generating new frames, with each new frame being used with a window of preceding frames to approximate the position of the camera 130 using the method 500.

At operation 510, the path extraction engine 412 receives 2D digital video, and optionally depth information. In real-time embodiments, operation 510 includes the next frame of source video from the camera 130. In offline embodiments, the source video may be captured by the camera 130 or a similar digital video capture mechanism (e.g., virtual camera) prior to processing (e.g., not contemporaneously with the processing), and operation 510 includes identifying the next frame of the source video.

Figure 5B:
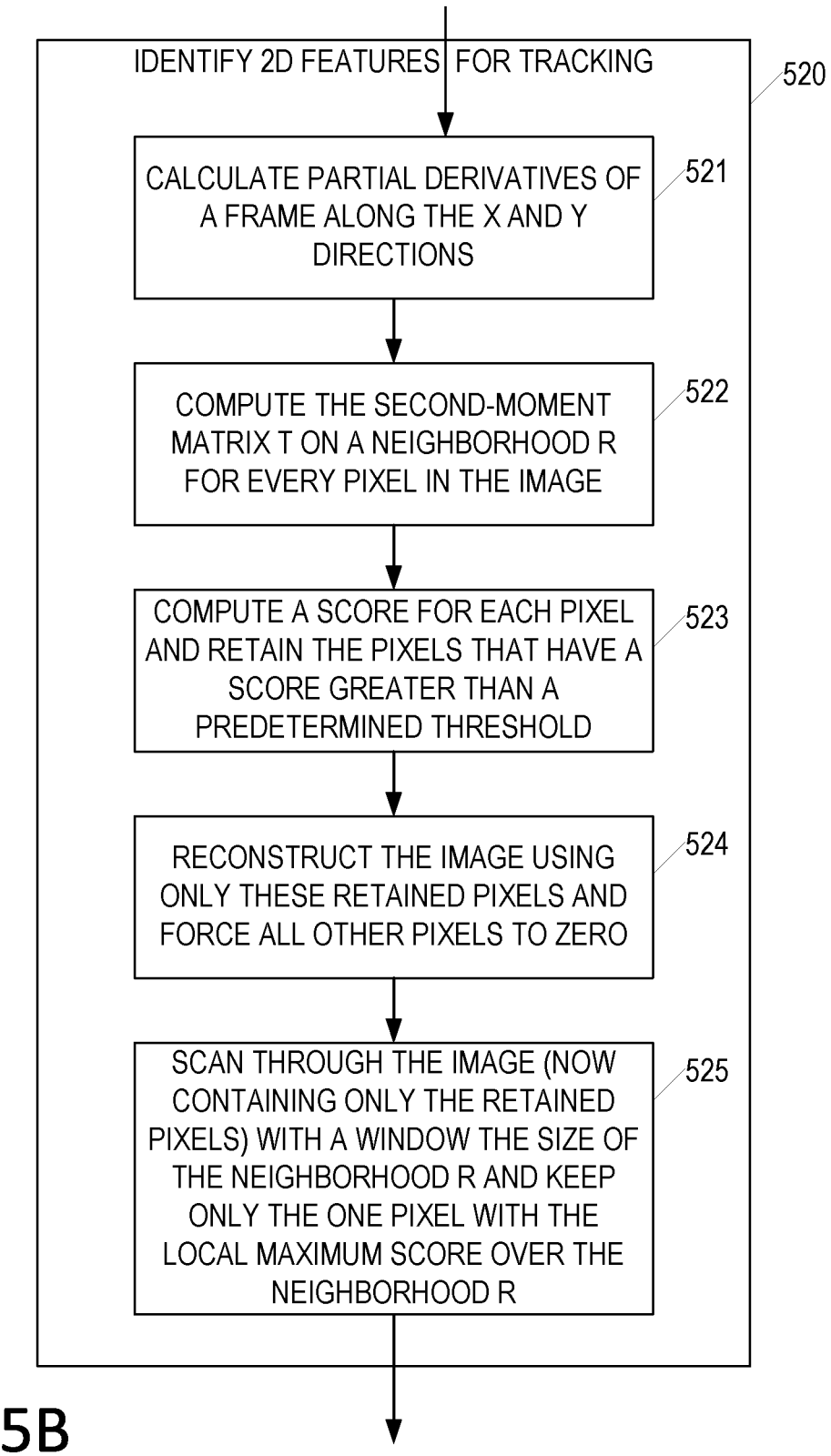
FIG. 5B is a flowchart illustrating additional operations for identifying 2D features within the frames of the source video, shown in FIGS. 3A and 3B.

At operation 520, the path extraction engine 412 processes the source video to identify 2D features (e.g., "strong features") that will be tracked and analyzed over multiple frames (e.g., the window of frames). FIG. 5B includes operations for identifying 2D features within the source video (e.g., within frames 300, 302). At operation 521, the path extraction engine 412 calculates the partial derivatives of a frame along the x and y directions.

At operation 522, the path extraction engine 412 computes the second moment matrix V, a 2×2 matrix, on a neighborhood U for every pixel in the frame using, for example, equation (1):

$$V = \begin{bmatrix} \sum_U \left(\frac{\partial I}{\partial x}\right)^2 & \sum_U \left(\frac{\partial I}{\partial x}\right)\left(\frac{\partial I}{\partial y}\right) \\ \sum_U \left(\frac{\partial I}{\partial x}\right)\left(\frac{\partial I}{\partial y}\right) & \sum_U \left(\frac{\partial I}{\partial y}\right)^2 \end{bmatrix}, \quad (1)$$

where $$\frac{\partial I}{\partial x} \text{ and } \frac{\partial I}{\partial y}$$

are the partial derivatives of the frame intensity (or brightness, or luminance) I(x,y,time) along the x and y directions, respectively. Here, time represents discrete time, which is associated with frames such that each value of time represents an individual frame. At operation 523, the path extraction engine 412 then computes a score for each pixel and retains the pixels that have a score greater than a predetermined threshold. For example:

$$\text{Score}_{Pixel} = \frac{\det(V)}{\text{Trace}(V) + \varepsilon}, \quad (2)$$

where ε is a small number (e.g., 10e−6) and is used to avoid a division by zero error, det(V) is the determinant of V, and Trace(V) is the trace of V.

At operation 524, the path extraction engine 412 reconstructs the frame to generate a "reconstructed frame", retaining only the pixels that have a score greater than the pre-determined threshold (e.g., all other pixels from the original frame are forced to zero). At operation 525, the path extraction engine 412 scans through the reconstructed frame with a window the size of the neighborhood U and keeps only the one pixel with the local maximum score over the neighborhood U.

Referring back to FIG. 5A, at operation 530, the path extraction engine 412 tracks 2D motion of the features (e.g., from one frame to the next), and at operation 540, the path extraction engine 412 estimates motion in the pixels linked to the tracked features. Optical flow is a measure of the motion of the features from one frame to the next. The 2D motion of the features is captured in a flow calculation. More specifically, the 2D motion is extracted from the spatially filtered data by determining the optical flow of the feature pixels between images, and by exploiting the local information around the feature pixels to solve the resulting equations. An optical flow equation is used:

$$\frac{\partial I}{\partial x}u + \frac{\partial I}{\partial y}v + \frac{\partial I}{\partial t} = 0, \quad (3)$$

where u and v are the unknown x and y components of the optical flow for pixel I(x,y,t). Further, the path extraction engine 412 uses information from a small neighborhood around the examined pixel (e.g., by collecting constraints of neighboring points) and solving the resulting over-constrained set of linear equations.

In the example embodiment, the path extraction engine 412 uses an inverse pyramidal scheme. More specifically, the 2D motion of the features is computed at the deepest level of the pyramid first, and then the result is propagated one level up as an initial guess. A refined flow is then computed for this next level, and the result is propagated one level higher, and so on until a top level 0 is reached. Each level in the pyramid is an image or frame of a different resolution, where level 0 is the full resolution frame, and each level below has a lower resolution than the one above. For example, presume the original frames of the 2D video are of 1920×1080 resolution. In some embodiments, the resolution is decreased by half at each level, such as:

| Level 0: | 1920 × 1080 |
| Level 1: | 960 × 540 |
| Level 2: | 480 × 270 |
| Level 3: | 240 × 135 |
| ... | |

At each level, the path extraction engine 412 uses equation (3) as a brightness constancy constraint equation, where (u, v) are the unknown x and y components of the optical flow for a pixel, and where $$\frac{\partial I}{\partial x}, \frac{\partial I}{\partial y}, \text{ and } \frac{\partial I}{\partial t}$$

are the partial derivatives of the frame in the x, y, and t directions for the pixel, respectively (e.g., and are therefore known). Equation (3) is one equation with two unknowns and, as such, may not be solved directly. To solve equation (3), the path extraction engine 412 exploits information from the neighborhood U around each feature to collect constraints. Each pixel in the neighborhood U around the pixel adds one constraint equation for each pixel. So for each pixel in the neighborhood U, there is an equation (3) with different values for $$\frac{\partial I}{\partial x}, \frac{\partial I}{\partial y}, \text{ and } \frac{\partial I}{\partial t}.$$

The resulting over-constrained (e.g., more equations than unknowns) set of linear equations is in the form:

$$V * (u, v) = \left(\frac{\partial I}{\partial t} * \frac{\partial I}{\partial x}, \frac{\partial I}{\partial t} * \frac{\partial I}{\partial y}\right), \quad (4)$$

where V is the second-moment matrix (e.g., calculated in the feature extraction process of equation (1)), and where the symbol * denotes multiplication. The system is solved to find the optical flow vector (u,v) for the pixel at the center of the neighborhood U. Since the pixels retained in the feature detection process were the pixels with the highest scores, V is invertible, and therefore the system of equations can be solved. As such, the classical ill-conditioned problems of some known local estimation techniques are addressed. In other words, some of the known methods may not find solutions in some cases.

At operation 550, the path extraction engine 412 extracts the dominant 2D motion caused by the motion of the camera 130 in 3 dimensions. More specifically, operation 550 reduces the effects of secondary motion on the estimate of the camera motion (e.g., between two successive frames, 300 to 302) in order to, for example, enhance or improve the estimated camera path (e.g., as compared to the actual camera path). The term "secondary motion", as used herein, refers to motion occurring in the source video that is not associated with the camera motion, such as the motion of moving objects. For example, presume that the source video of the table 210 also includes a ball (not shown) on top of the table 210, and rolling in a particular direction. As such, the table 210 has no secondary motion (e.g., it is stationary with respect to the 3D environment 200), but the ball is rolling across the table top and, thus, has a secondary motion relative to the 3D environment 200.

Figure 5C:
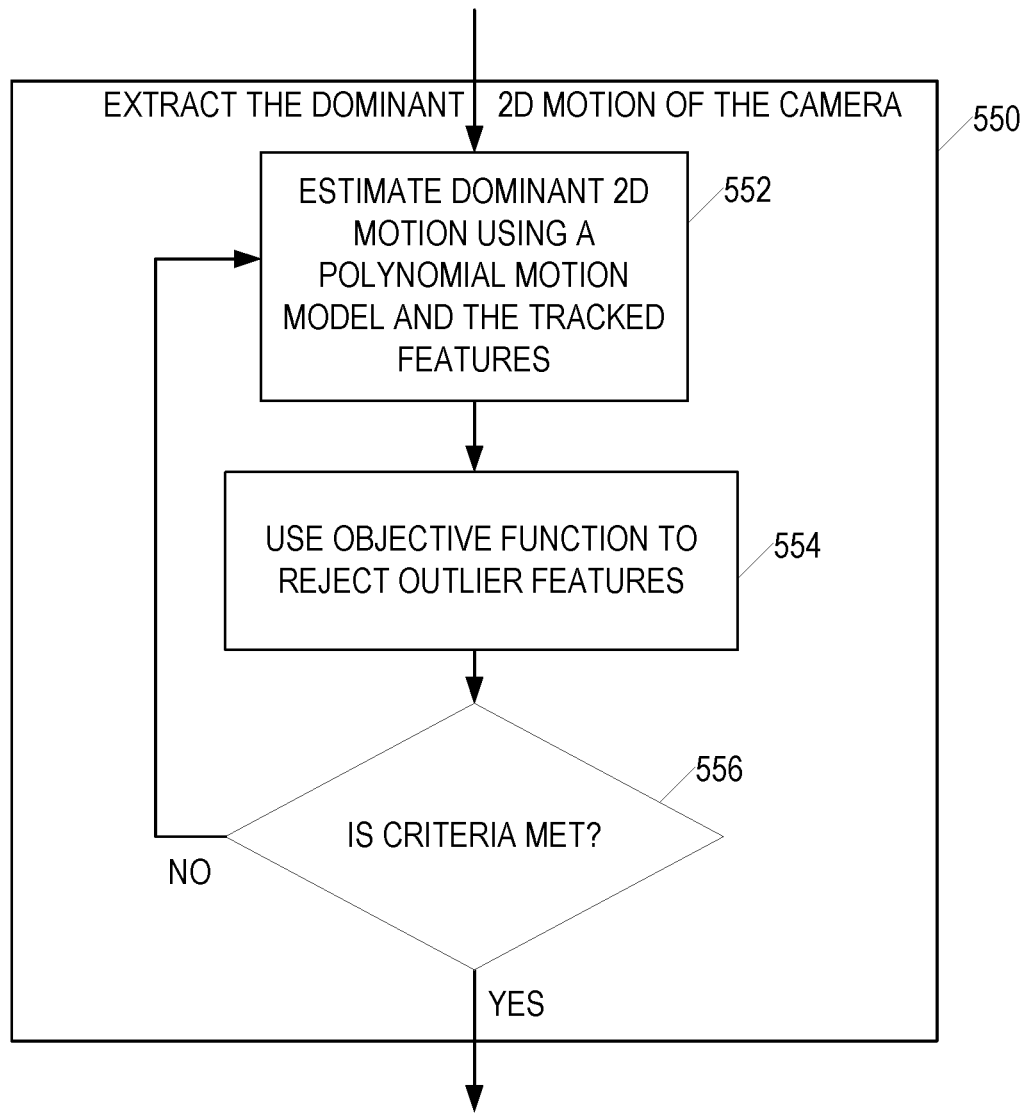
FIG. 5C is a flowchart illustrating additional operations for extracting the dominant 2D motion caused by the camera.

To reduce the effects of such secondary motion, the path extraction engine 412 performs a customized technique based loosely on Robust Statistics. FIG. 5C includes operations for extracting the dominant 2D motion caused by the camera (e.g., by eliminating features corresponding to secondary motion(s)). At operation 552, the path extraction engine 412 estimates dominant 2D motion induced by the camera motion using a polynomial motion model and the tracked features.

The feature tracking process results in each feature having a 2D path. The polynomial motion model fits a single polynomial to all of those paths. However, some of these feature paths may be tracking features that have undesirable secondary motion and may be rejected.

At operation 554, the path extraction engine 412 uses an objective function to reject outlier features. As used herein, the terms "outlier feature" and "secondary feature" are used synonymously to identify features that are not associated with camera motion, but rather are connected to secondary motion. For example, the edges of an object falling through a scene are outlier features because the falling object has secondary motion not resulting from or representative of the camera's motion. The term "primary feature" is used to identify features that are determined to be providing camera motion (e.g., not secondary features). For example, edges of the stationary table 210 may be determined to be primary features because they do not move relative to the environment 200, and thus any motion within the images of associated features of the table 210 would provide camera motion.

More specifically, in order to reject them, a reprojection error of the features from one frame to the next is calculated and any feature path significantly different is rejected (e.g., with a maximum difference criterion). After dropping the outlier feature, the polynomial is recalculated (without the dropped feature) and the process begins again until a threshold is reached at operation 556. In some embodiments, the path extraction engine 412 uses M-estimation (class statistical estimators, e.g., "M-estimators") to eliminate outlier features corresponding to secondary motions. Operation 554 uses a multi-resolution framework that minimizes an M-estimator criterion to ensure robustness to outliers formed by the points corresponding to secondary motions. In some embodiments, an M-estimator function using Tukey's hard redescending biweight function may be used. Some known motion models may use linear models (e.g., translation, rotation, affine, homography). Here, this motion model is a quadratic motion model:

$$x' = a0 + a1*x + a2*y + a3*x*y + a4*x^2 + a5*y^2,$$

$$y' = b0 + b1*x + b2*y + b3*x*y + b4*x^2 + b5*y^2.$$

This quadratic motion model is better suited to represent 3D motion in the 3D plane (e.g., non-coplanar features, lense distortion, and so forth).

Referring again to FIG. 5A, at operation 560, the path extraction engine 412 estimates the 3D camera motion (e.g., the estimated camera path 230) from the dominant 2D camera trajectory. As mentioned above, the 3D motion of the camera includes translation (t) in 3 dimensions (e.g., along the x, y, and z axes), and rotation (R) in 3 dimensions (e.g., about the x, y, and z axes).

Figure 5D:
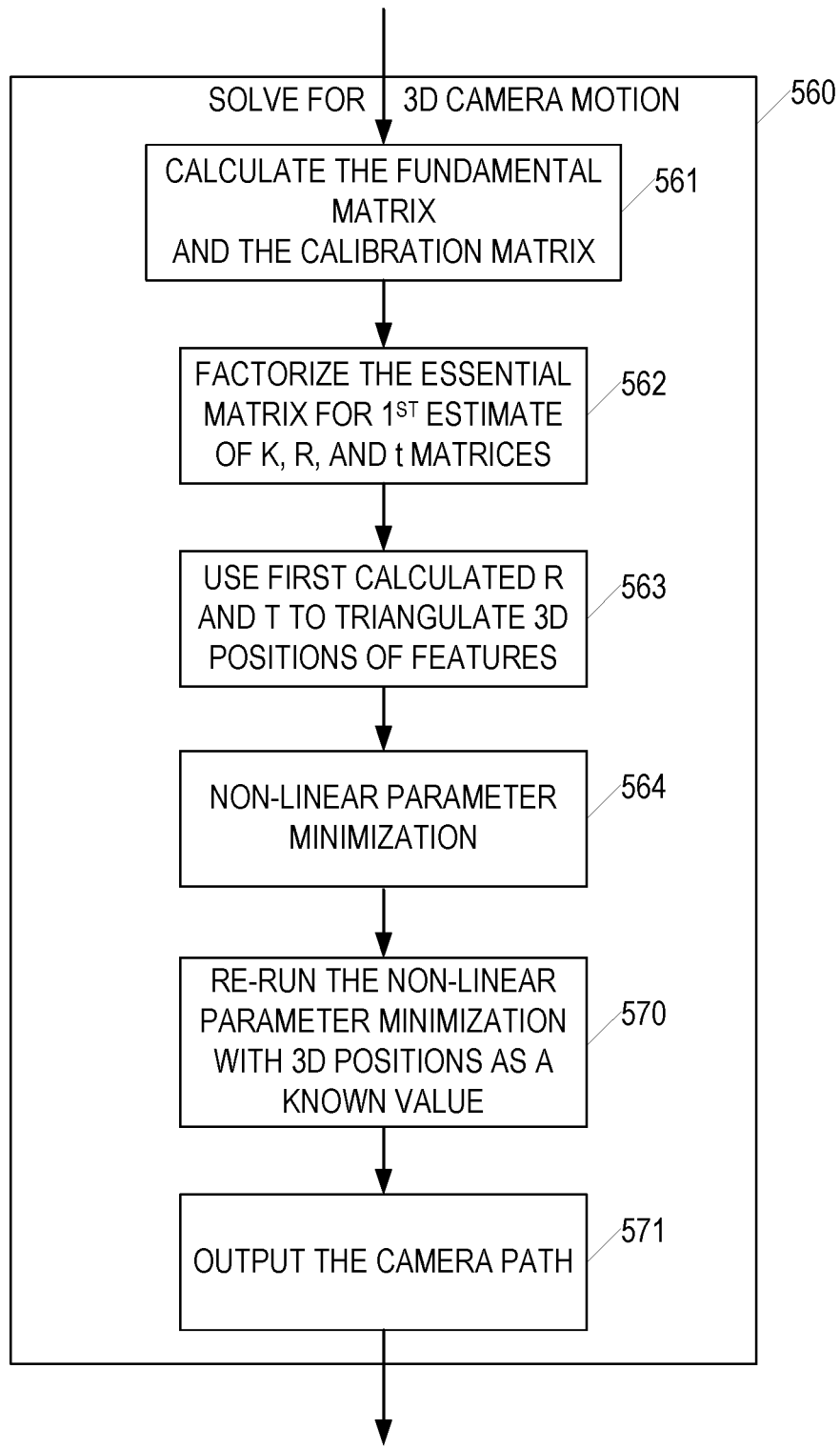
FIGS. 5D and 5E are a flowchart illustrating additional operations for estimating the 3D camera motion.
Figure 5E:
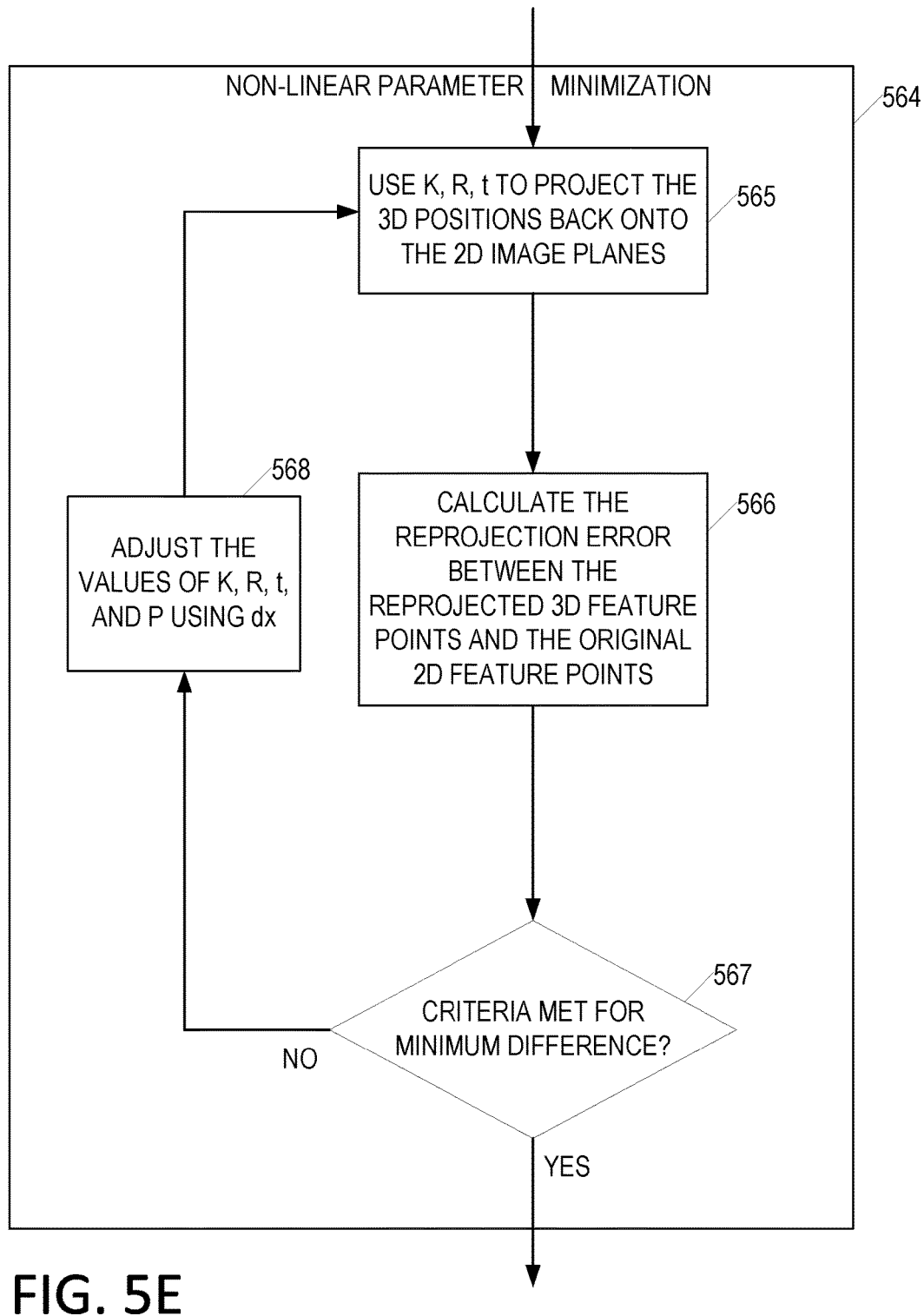

FIGS. 5D and 5E include operations for estimating the 3D camera motion at operation 560. At operation 561, the path extraction engine 412 calculates a fundamental matrix F and a calibration matrix K using known methods. The fundamental matrix F is a 3×3 matrix which relates corresponding points in stereo images using epipolar geometry, and the camera calibration matrix K is a 3×3 matrix, both of which are known to those in the art. The calibration matrix K contains the internal parameters of the camera, including focal length, axis skew, and optical center. The K matrix is calculated assuming the optical center is the center of the image and the skew is zero. With a skew coefficient of zero, the K matrix has three parameters, one that represents focal length (denoted a0), and two that represent the optical center (denoted a1 and a2). The focal length is used if it is known, otherwise the focal length may be arbitrarily set (e.g., as the smaller of two values: the image height, or the image width). The focal length may be provided by the user (e.g., as an input parameter), directly read from the images (e.g., as metadata), or calculated from the K matrix. The focal length is used to determine the scale of the scene, since the camera may change focal length at any moment. The fundamental matrix F is calculated using a least median of squares method that utilizes all image points. At operation 562, the essential matrix $F_{essential}$ is computed from F and K using a formula known to those familiar with the art:

$$F_{essential} = K^T * F * K. \quad (5)$$

The essential matrix $F_{essential}$ is then factored using known methods (e.g., single value decomposition (SVD)) into two matricies that represent the R matrix (rotation), and the t matrix (translation) for the camera:

$$F_{essential} = 2 \text{ matrices} = [t]_x * R. \quad (6)$$

In equation (6), the R matrix has three parameters (denoted a3, a4 and a5) that represent the rotations about the three axes of rotation in 3D space, commonly known as yaw, pitch and roll. The t matrix also has three parameters (denoted a6, a7 and a8) that represent the linear translations along the three axes in 3D space. The t matrix is shown as a skew-symmetric matrix representation of the cross product, which is a format well known to those in the art and is used for mathematical convenience, namely:

$$[t]_x = \begin{bmatrix} 0 & -a_8 & a_7 \\ a_8 & 0 & -a_6 \\ -a_7 & a_6 & 0 \end{bmatrix}. \quad (7)$$

This gives an initial or first approximation for K, R, and t, which are used as an initial input for operation 563. K, R, and t are used to calculate a first approximation of the 3D coordinates for the 2D features.

At operation 564, non-linear parameter minimization is performed for K, R, t, and the 3D points. Referring to FIG. 5E, the first approximation is used as the initial input for operation 564, where an optimization calculation of K, R, t, and 3D positions of the features is performed. For embodiments in which depth data (e.g., z value) is already provided, only x and y values are needed for the 3D coordinates, which makes the processing of step 564 much simpler.

At operation 564, the first estimates for K, R, t, and the triangulated 3D position are put into a non-linear parameters minimization algorithm. At operation 565, the calculated 3D feature coordinates from one iteration are projected back onto the 2D image planes (e.g., using the calculated K, R, and t), where the projected coordinates are compared with the original 2D positions of the features at operation 566. The difference between the reprojected 2D positions and the 2D positions from step 550 is the error that is minimized here. If, at conditional 567, a criterion for minimum difference is met, then the loop of FIG. 5E is complete. If, at conditional 567, the criterion is not met, then an incremental change in K, R, and t is calculated at operation 568, and iterates to operation 565, where K, R, t, and the 3D points are recalculated and put back into the iteration for the next pass.

More specifically, to start, a nine-parameter camera parameter vector, θ, is constructed from the values of K, R, and t:

$$\theta=(a0,a1,a2,a3,a4,a5,a6,a7,a8).$$

Every video frame has a different value of θ, which represents a camera pose. Remembering that a feature point is represented by its 3D position, P, and its observed projection p in 2D, then Dθ(P) may be used to map a 3D point to its 2D projection point, where Dθ is an operator that we apply to the 3D points, P, to get the image coordinates, p. The image coordinates are calculated as follows:

$$p = D\theta(P) = \left(\frac{p'_x}{p'_z}, \frac{p'_y}{p'_z}\right), \quad (8)$$

where p'=KR(P−t) are the homogeneous image coordinates of the 3D point P. Homogeneous image coordinate notation is well known to those in the art.

Let $\theta_i$ (i∈[1,N]) be the set of N camera poses that are to be recovered (e.g., one for every frame), and let $P_j$ (j∈[1,M]) be the set of M 3D points that are to be recovered wherein the M points are in the features. From the feature tracking process 550, there are a set of 2D projection trajectories $T_{ij}$, which are a collection of image points, with $T_{ij}$ being the observed projection of $P_j$ in $\theta_i$.

The following non-linear equation (9) is minimized:

$$(\theta, P) = \mathrm{argmin}\left(\sum_{i=0}^{N}\sum_{j=0}^{M} \rho_{ij} \cdot norm(T_{ij} - D\theta_i(P_j))\right), \quad (9)$$

where $T_{ij}$−$D\theta_i(P_j)$ represents the difference between the 2D trajectory (e.g., from step 550) and the reprojected points. In equation (9), $\rho_{ij}$ is a scalar that takes the value 1 if the point $P_{ij}$ is seen from camera j, and 0 otherwise. To compute the minima, a vector $\vec{x}$ is defined:

$$\vec{x} = (x_1, x_2, x_3, \ldots, x_k), (k \in [1, M \times N]),$$

where $x_i = (\theta_n, P_m)$, and $n = \frac{i}{N} + 1$, and $m = i \mod M$.

The vector $\vec{x}$ is used to define another vector function, E(x):

$$E(x)=(e_1(x_1),e_2(x_2),e_3(x_3), \ldots, e_k(x_k)),$$

where $$e_1(x_1)=\rho_{nm} \cdot norm(T_{nm}-D\theta_n(P_m)).$$

The solution to the minimization problem is the vector $\vec{x}=(x_1, x_2, x_3, \ldots, x_k)$ that minimizes the L2 norm (or vector norm) of E(x). To find the solution, the strategy is to solve a sequence of approximations. The first approximations, x(0) and E(x(0)), are initialized with the solution found in step 562 (e.g., the first estimates for R and T). An iterative scheme is then used where x(0) is the first approximate solution, then x(1) is the next improved solution in the iteration, followed by x(2) and x(3) and so on.

For each iteration starting with n=0, the following 6 steps are performed. First, a Jacobian matrix, J, of the vector E is computed. Next, compute PJ=sqrt(PsuedoInverse(J)). Then solve the linear system:

$$(J*dx+E(x(n)))*(J*dx+E(x(n)))+a*(PJ*dx)*(PJ*dx),$$

for dx using QR factorization. Then increment x(n+1)=x(n)+dx at operation 568. Then increment n=n+1. The $\vec{x}$ vector is an unknown (e.g., camera param θ and 3D point P). The system is solved by using increments dx. At each iteration, the increment dx is estimated:

$$dx=(\Delta\theta,\Delta P),$$

where dx represents a small change added to the previous values of θ and P from the previous iteration. In other words, a new estimate of x(x(n+1)) is generated, using dx and the previous estimate of x(x(n)). If, at operation 567, norm(E(x(n+1))) is less than a convergence threshold, the loop is exited. Otherwise, another iteration of these six steps is performed.

Returning now to FIG. 5D, at operation 570, the path extraction engine 412 reruns the non-linear parameter minimization with 3D positions as known values, optimizing only for K, R, and t, the output of which yields the camera path, R and t, for the camera. The camera path is output at operation 571. In other words, the same optimization is performed, but holding the 3D points P as constants and only optimize on θ.

Referring again to FIG. 5A, after operation 560, the path extraction engine 412 has approximated or estimated the camera path 230 from the source video. In real-time embodiments, frames of the 2D video continue to be generated by the camera. The method 500 may operate as a running average with a buffer of frames to start. In other words, the method 500 may initially use a few frames with some movement (e.g., translation and rotation), and then the method 500 works like a moving average with a window of frames (e.g., the last n frames). As such, features are constantly being found and the optical flow is calculated. Operation 550 may need several frames to fit a polynomial; hence the initial buffer of frames is used. In FIG. 5A, the method 500 is illustrated as looping from operation 560 to operation 510 to indicate the subsequent processing of the next frame.

In some embodiments, at operation 580, the path extraction engine 412 uses the camera path 230, and optionally the source video, to generate an animation clip. In other words, the source video and camera path 230 may be used to render additional content in the source video to generate the animation clip. For example, a 2D or 3D animated object such as a plate or an animated monster may be rendered on the table 210 of the source video. The camera path 230 may be used to determine where the camera is relative to the table 210, and thus where the animated object should be displayed in relation to the object(s) in the source video as the camera moves along the path 230.

In some embodiments, at operation 582, the path extraction engine 412 uses the camera path 230 to generate an animation curve. An animation curve is the path that an object follows in 3 dimensions. For example, the path of the camera is an animation curve. Animation curves may be manipulated in many ways using many different tools. Manipulating the curve in this way and then reapplying the curve to a camera changes the way the camera moves when compared to the original path. Manipulating an existing curve may be easier than creating a new curve from scratch.

In some embodiments, at operation 584, the path extraction engine 412 uses the camera path 230 to update the camera pose live.

In some embodiments, real-time operation may be practical in situations where depth information is not included with the 2D video (e.g., with just RGB video). If, for example, there is a known target image or "reference image" (e.g., with known feature points) within the scene of the 2D video, the path extraction engine 412 may use this reference image to ease computational requirements for certain aspects of the processes described herein. For example, a piece of paper with a specific, known drawing on it, may be visible within the 2D video for a few seconds. While the path extraction engine 400 is analyzing the video, the reference image may be located by the path extraction engine 412, and the visual appearance of the reference image in the 2D video may be compared to its known dimensions. This comparison allows for the calculation of some internal camera parameters and thus the calculation of the K-matrix. With these parameters, and because the reference image is on a plane (e.g., on the piece of paper), the calculation of the fundamental matrix may be bypassed, and the coordinate system may be chosen relative to the plane of the reference image (e.g., as the z=0 plane in the scene), easing the computational burden on the path extraction engine 412 and allowing the camera path to be determined in real-time.

In some embodiments, the 2D video includes a known reference image within the scene, and the path extraction engine 412 uses the known reference image to determine the camera path 230. In the example embodiment, the path extraction engine 412 may pre-analyze the reference image (e.g., before the 2D video is analyzed) to identify and extract feature points (p1(x1,y1), p2,(x2,y2), . . . , pn(xn,yn)) in the reference image (e.g., from a scanned photo or digital version of the reference image), where (xi, yi) is the 2D coordinates of the points relative to an arbitrary origin in the target image. The path extraction engine 412 may use the same feature extraction procedure as described above.

Since the reference image is on a piece of paper (e.g., photographic paper or a piece of cardboard), all the reference image points are on a common plane. As such, a 3D coordinate system may be chosen such that their z coordinates are 0:

$$ps1(xs1,ys1,0), ps2(xs2,ys2,0), \ldots, psn(xsn,ysn,0),$$

where psi denotes a 3D point at (xsi, ysi, zsi). In some embodiments, zsi is set to 0 in the 3D world of the video at the location of the target image in order to have a reference. Setting zsi=0 allows the path extraction engine 412 to exploit the co-planarity of the feature points in this coordinate system in order to estimate the camera path relative to this coordinate system using the above method. This process serves to stage the reference image for use during later camera path extraction of a 2D video.

While analyzing the 2D video, which contains the reference image visible within the 2D video, the path extraction engine 412 detects multiple feature points within the 2D video and matches them to ps1, ps2, . . . , psn from the base reference image (e.g., using the method as described above). This generates a set of m 2D points on the video frame, pd1(xd1,yd1), pd2(xd2,yd2), . . . , pdm(xdm,ydm), where pdi denotes a 2D point at (xdi, ydi), where m<=n (e.g., because not all of the feature points may necessarily be visible or detected from the target image), which are related to their corresponding 2D feature points on the reference image, as well as their corresponding 3D coordinates ps1, ps2, . . . , psn (e.g., via the arbitrarily defined 3D coordinate system described above). In other words, the path extraction engine 412 detects 2D feature points of the reference image in the 2D video, and then matches these feature points with the 2D feature points detected within the base reference image. As such, for each feature recognized in the 2D video, the path extraction engine 412 may associate a 3D coordinate.

Next, the path extraction engine 412 solves:

$$A*X=B. \tag{10}$$

with least squares using the generalized inverse. The path extraction engine 412 computes a solution vector, X:

$$X=\{X1,X2,X3,X4,X5\}.$$

A is constructed such that the solution vector, X, of equation (10) is the basis for computing T and R. More specifically, A is a 5×n matrix, as follows:

$$A=\{\{yd1*xs1,yd1*ys1,yd1,-xd1*xs1,-xd1*ys1\},$$
$$\{yd2*xs2,yd2*ys2,yd2,-xd2*xs2,-xd2*ys2\}, \ldots, \{ydn*xsn,ydn*ysn,ydn,-xdn*xsn,-xdn*ysn\}\},$$

and:

$$B=\{xd1,xd2,xd3, \ldots, xdn\}.$$

Next, solving equation (10):

$$X=Ag*B,$$

where:

$$Ag=\text{Transp}(A)*\text{Inverse}(A*\text{Transp}(A)).$$

The path extraction engine 412 then directly computes the x and y components of the camera translation T.tx and T.ty using math that can be executed by modern computers in real-time. More specifically:

Let $S = X1^2 + X2^2 + X4^2 + X5^2$.

Then: $T \cdot ty = \sqrt{\dfrac{S - \sqrt{S*S - 4*(X1*X5 - X4*X2)^2}}{2*(X1*X5 - X4*X2)^2}}$, and: $T \cdot tx = X3 * T \cdot ty$.

The path extraction engine 412 then directly computes the camera rotation, R:

$$R.r11=X1*T.ty,$$

$$R.r12=X2*T.ty,$$

$$R.r13=\sqrt{(1-R.r11*R.r11-R.r12*R.r12)},$$

$$R.r21=X4*T.ty,$$

$$R.r22=X5*T.ty,$$

$$R.r23=\sqrt{(1-R.r21*R.r21-R.r22*R.r22)},$$

where, for example, R.r13 denotes the R matrix element for row 1 and column 3, and similarly for the other matrix elements. The outer product of the first two rows is then used to get the third row:

$$R.r31=R.r12*R.r23-R.r13*R.r22,$$

$$R.r32=R.r13*R.r21-R.r11*R.r23,$$

$$R.r33=R.r11*R.r22-R.r12*R.r21.$$

Finally, the path extraction engine 412 computes the z component of the camera translation T.tz and the focal length K.k11=K.k22:

Let $Y=\{Y1,Y2\}$.

Then C is constructed:

$$C=\{\{R.r21*xs1+R.r22*ys1+T.ty,yd1\},\{R.r21*xs2+R.r22*ys2+T.ty,yd2\},\ldots,\{R.r21*xsn+R.r22*ysn+T.ty,ydn\}\},$$

and D is constructed:

$$D=\{yd1*(R.r31*xs1+R.r32*ys1),yd2*(R.r31*xs2+R.r32*ys2),\ldots ydn*(R.r31*xsn+R.r32*ysn)\}.$$

Now solving for C*Y=D in the least square sense using the generalized inverse method:

$$Y=Cg*D,$$

where:

$$Cg=\text{Transp}(C)*\text{Inverse}(C*\text{Transp}(C)),$$

and:

$$K.k11=K.k22=Y1,$$

$$T.tz=Y2.$$

At least one benefit provided by the above method is direct calculation using matrix mathematics. This type of processing is computationally efficient for modern computers and, as such, may be performed in real time. Methods using non-linear optimization, for example, may be more heavily computational.

Figure 6:
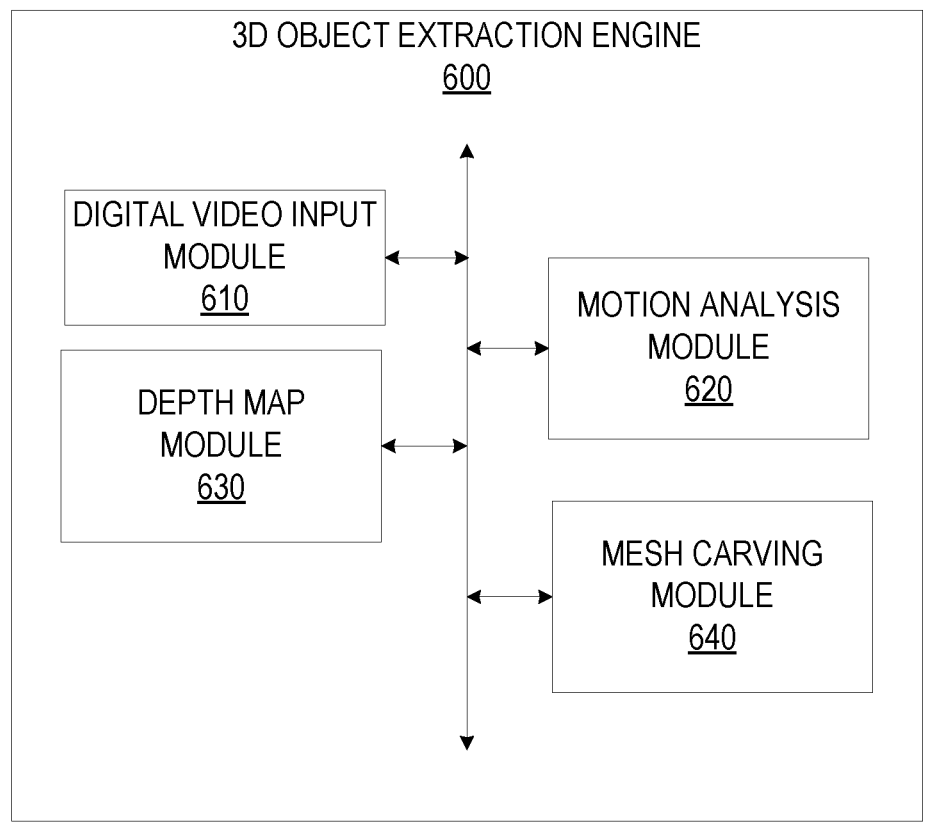
FIG. 6 is a block diagram showing components provided within a 3D object extraction engine, according to some embodiments.

FIG. 6 is a block diagram showing components provided within a 3D object extraction engine (or just "object extraction engine") 600, according to some embodiments. In some embodiments, the object extraction engine 600 may be similar to the object extraction engine 414. The object extraction engine 600 may be a part of a mobile computing device such as the OHMD device 120, or may be on a desktop device (e.g., personal computer or server machine(s) (not shown)) or a server device (e.g., a cloud server), and may be similar to the graphics processing engine 150. Further, components of the object extraction engine 600 may be similar to components of the path extraction engine 412, and the object extraction engine 600 may be used in conjunction with the path extraction engine 412. For example, the object extraction engine 600 may be combined with the path extraction engine 412 to form a combined device or system (not separately shown) for performing the operations and methods described herein.

The object extraction engine 600 includes a digital video input module 610, a motion analysis module 620, a depth map module 630, and a mesh carving module 640. The modules themselves are communicatively coupled (e.g., via appropriate interfaces) to each other and to various data sources, so as to allow information to be passed among the modules, or so as to allow the modules to share and access common data. The digital video input module 610 may be similar to the digital video input module 410, and the motion analysis module 620 may be similar to the motion analysis module 430. The motion analysis module 620 may also compute optical flow for the pixels of each frame (e.g., for all pixels, and from frame to frame).

The depth map module 630 computes depth maps for the 2D video. More specifically, in the example embodiment, the depth map module 630 computes depth maps for one or more frames of the 2D video, where each frame addressed by the depth map module 630 has an associated depth map created. A depth map for a particular frame, such as the first frame 300 shown in FIG. 3A, includes distance values, or depths, for one or more pixels within the frame. A distance value represent a determined or estimated linear distance from the camera to an area on an object (e.g., in the FOV of the camera, or in the frame of the 2D video) at a point on the object represented by a particular pixel within the frame. As such, the depth map for the first frame 300 includes depths for the one or more pixels.

In the example embodiment, the depth map module 630 determines a depth map estimation for all pixels in each frame, or for some subset of pixels of each frame (e.g., a selected section of the video). In other words, the depth map that is computed for each frame includes a depth value for each pixel in the frame. A depth map may include an illuminanace image where the brightness of each pixel represents the depth of the image point in space. Lighter pixels may represent points closer to the camera and darker pixels may represent points further away, or vice versa. Further, depth may be measured from the camera plane, or measured from some other arbitrary plane.

The depth map module 630 computes the depth map for each frame using the optical flow of the pixels (e.g., provided by the motion analysis module 620) and the camera path (e.g., provided by the path extraction engine 412). Further, the calculation of pixel depth for a given frame may use one or more frames immediately before and/or after the given frame. With 2D video, the same object may be seen from many angles over many frames (e.g., as the source camera moves through the 3D environment). This duplication, or the estimating of pixel depth using multiple estimates for the same point, improves the accuracy of the depth estimation. For each frame X, the depth map module 630 may use the 3D trajectory position for that frame (e.g., from the camera path) combined with the depth of each pixel, to associate the pixels with points in 3D space. Further, for each frame X, the depth map module 630 may use n frames before and after frame X to calculate a weighted average of the corresponding pixels in those frames in order to determine an average depth value for each pixel in the frame X. As such, in real-time embodiments, some of these calculations may need to be delayed by a few frames (e.g., by n or more frames).

The mesh carving module 640 uses the depth maps of the frames to generate, or "carve", or "extract" one or more 3D objects (e.g., virtual objects) from the series of frames of the 2D video. In other words, the extracted 3D objects are virtual representations of objects appearing in the 2D video. In some situations, the mesh carving module 640 may extract portions of objects or surfaces of objects (e.g., when all points on the object may not be visible throughout the content of the 2D video). In some situations, the mesh carving module 640 may extract entire 3D volumetric objects (e.g., enclosed volumes, when the 2D video includes enough perspectives of the object to enable the mesh carving module 640 to define a volume). Mesh carving is described in greater detail below with respect to FIG. 8.

Figure 7:
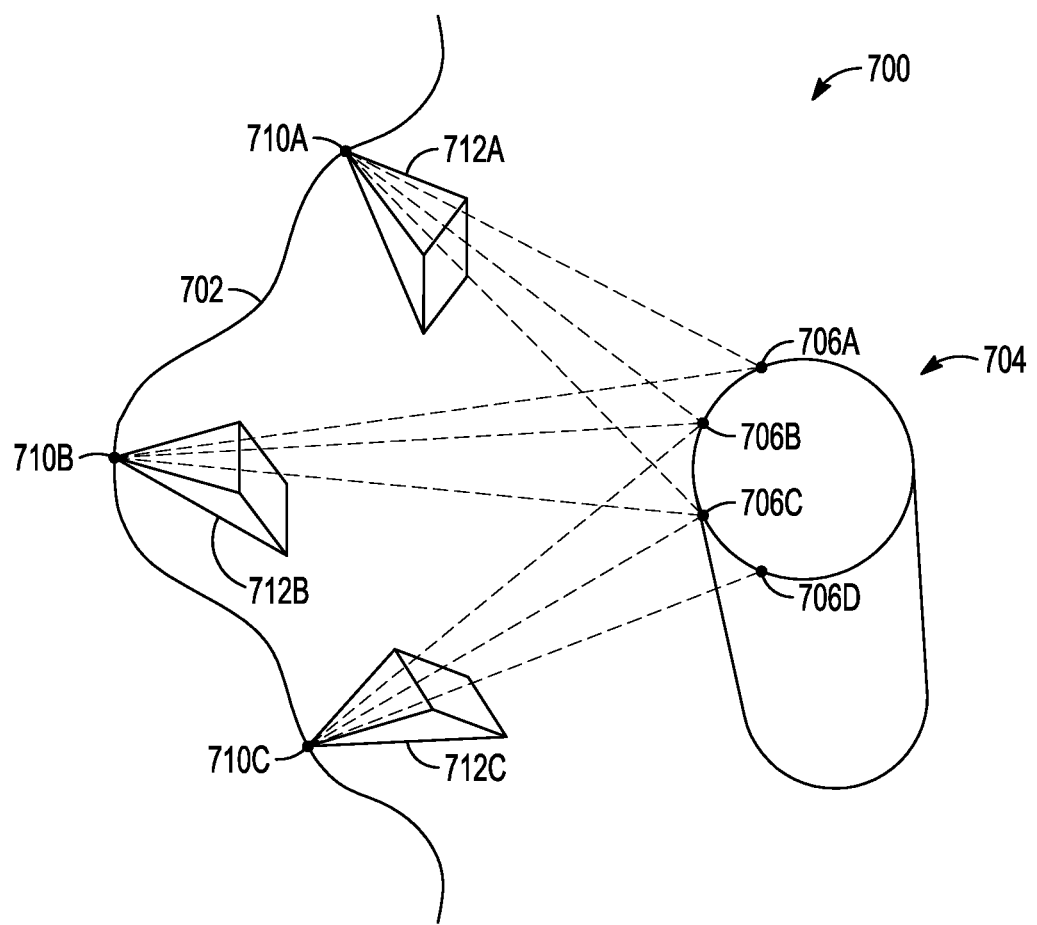
FIG. 7 illustrates an example environment through which a camera device, such as the OHMD shown in FIG. 1, moves along a camera path and captures 2D video of an object in the environment.

FIG. 7 illustrates an example environment 700 through which a camera device, such as the OHMD device 120 shown in FIG. 1, moves along a camera path 702 and captures 2D video of an object 704 in the environment 700. The environment 700 may be similar to the environment 200, the camera path 702 may be similar to the camera path 230, and/or the object 704 may be similar to the table 210 or any component thereof, such as the table leg 214. In some embodiments, the 3D object extraction engine 600 is integrated into the OHMD device 120 and processes frames of the 2D video as the wearer 110 moves along the camera path 702.

The object 704 may be a real-world object (e.g., as captured by the OHMD device 120 while moving through and capturing 2D video of the real-world environment 200), or the object 704 may be a rendered virtual object (e.g., as captured in 2D video of a 3D virtual environment, such as an environment rendered by a game engine). It should be understood that only one object 704 is shown in the environment 700 for ease of illustration and discussion, but that the 3D object extraction engine 600 may be configured to analyze and extract one or many 3D objects 704 while analyzing the 2D video captured by the camera device or virtual camera.

As the camera moves along the camera path 702, the camera captures digital video (e.g., 2D RGB, or RGB+D, as described above). The camera path 702 includes camera positions 710A, 710B, and 710C (collectively "camera positions 710"). The camera positions 710 may be similar to the points 232A, 232B shown in FIG. 2. At each camera position 710A, 710B, 710C, the camera captures a frame of the 2D video from a particular perspective. These perspectives are illustrated as fields of view (FOVs) 712A, 712B, and 712C (collectively "fields of view 712"). These FOVs 712 may be similar to the FOVs 234A, 234B shown in FIG. 2. In the example shown in FIG. 7, the camera position 710A represents a first point in time at which a first frame is captured, the camera position 710B represents a subsequent point in time at which a second, subsequent frame is captured (e.g., the next frame in the sequence), and the camera position 710C represents a subsequent point in time at which a third, subsequent frame is captured. It should be understood that the distances among the camera positions 710A, 710B, and 710C are exaggerated in FIG. 7 for purposes of illustration. In other words, the speed of the wearer 110 (e.g., walking or running speed) as compared to the frame rate of the camera 130 (e.g., 30 frames per second, or 1 frame captured every $1/30^{th}$ second) may cause the camera positions 710 to be closer together than shown in FIG. 7.

At each camera position 710, the camera captures a frame consistent with the associated FOV 712 of the camera. Further, at each camera position 710, the object 704 is within the FOV 712 of the camera, and thus occupies some portion of the frame. For purposes of illustration and discussion, FIG. 7 identifies multiple object points 706A, 706B, 706C, and 706D (collectively "object points 706") on the surface of the object 704. Each of these object points 706 is represented or covered by a single pixel in one or more of the frames captured at one or more of the camera positions 710. For example, the object point 706A is visible at the camera positions 710A and 710B, but not at the camera position 710C. Similarly, the object point 706B is visible at the camera positions 710A, 710B, and 710C. It should be understood that the frames may include many other pixels associated with other points on the surface of the object 704, but that only a few object points 706 are illustrated in FIG. 7 for purposes of discussion and convenience.

During processing of the 2D video, the 3D object extraction engine 600 analyzes the frames of the 2D video (e.g., including the frames associated with the camera positions 710A, 710B, and 710C) and carves a mesh to construct a virtual 3D object (e.g., surface, or volume) of the object 704. More specifically, depth maps are created for each frame at each camera position 710, where the 3D object extraction engine 600 computes a depth or distance value for one or more pixels such as the pixels associated with the object points 706. In other words, the depth associated with a pixel of a frame represents an approximation of the distance between, for example, the camera position 710A and the object point 706A, where the trajectory is illustrated as broken lines in FIG. 7, and where the length of the broken line is equivalent to the depth or distance from that camera position 710 to the corresponding object point 706. Further, in some embodiments, the camera positions 710 (e.g., of the camera path 702) are estimated by the path extraction engine 412 (e.g., the camera path 702 may be provided by the path extraction engine 412). In other embodiments, the camera path 702 and/or camera positions 710 are pre-determined (e.g., provided by another source as input to the object extraction engine 600). In some embodiments, pixel depths for a given pixel are averaged over several neighboring frames, as described above (e.g., the n frames before and after the current frame, and using the associated pixels). For example, pixel depths for the pixels in the frame associated with the camera position 710B may use the associated pixels in the frames associated with the camera positions 710A and 710C (e.g., the frames immediately before and after the camera position 710B).

After processing the 2D video, the 3D object extraction engine 600 has constructed a virtual 3D object of the object 704 based on analysis of the 2D video. The 3D object may be a surface, such as the surface of the object 704, or an enclosed volume (e.g., if the 2D video includes enough views of the object 704 to define a volume). The process for extracting the 3D object(s) from the 2D video is described in greater detail below with respect to FIG. 8.

Figure 8:
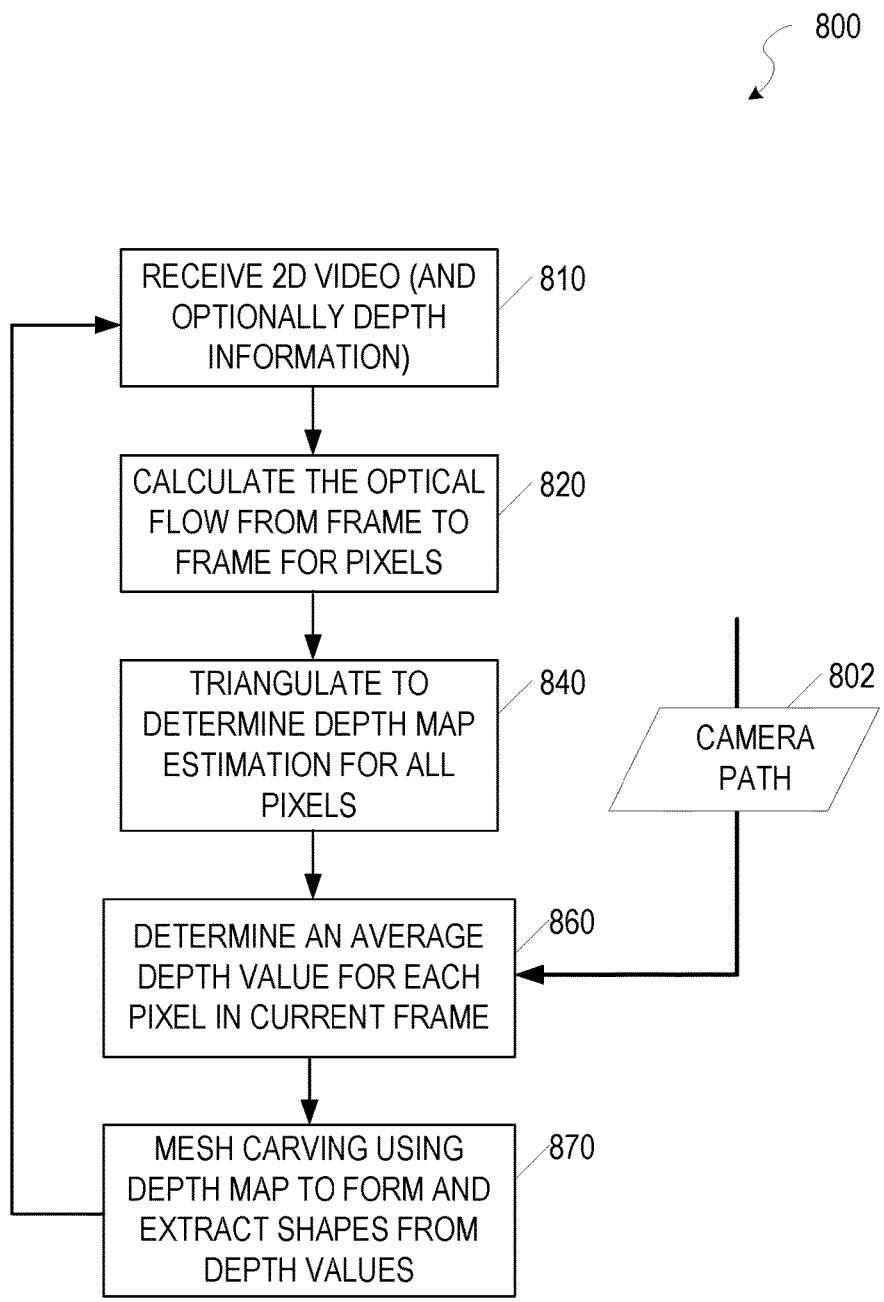
FIG. 8 is a flow chart of a method for extracting 3D objects from 2D video.

FIG. 8 is a flow chart of a method 800 for extracting 3D objects from 2D video. In the example embodiment, the 2D video is captured by a camera device such as the OHMD device 120 shown in FIG. 1 in the environment 700 shown in FIG. 7. The method 800 is performed by the 3D object extraction engine 600 (e.g., operating as a part of the OHMD device 120). Further, a camera path 802 is extracted by the path extraction engine 412 from the source video captured in the environment 700 by the camera 130 in a real-time camera path extraction embodiment, as described above. In other embodiments, the method 800 is performed in an offline embodiment (e.g., using a desktop computing device or a server device, and not necessarily contemporaneously with the capture of the source video), and the camera path 802 may be provided from other sources (e.g., as a pre-determined input).

At operation 810, the 3D object extraction engine 600 receives 2D digital video, and optionally depth information. If depth information is included, the method 800 may skip to step 870. In real-time embodiments, the source video may come live from the camera 130 (e.g., one frame at a time). In offline embodiments, the source video may be captured by the camera 130 or a similar digital video capture mechanism (e.g., virtual camera), prior to processing (e.g., not contemporaneously with the processing).

At operation 820, the 3D object extraction engine 600 calculates the optical flow from frame to frame for all pixels. For example, each pixel of a current frame may be associated with a particular pixel or set of pixels in the previous frame. At operation 840, the object extraction engine 600 determines a depth map estimation for all pixels in the frame.

More specifically, in the example embodiment, for two frames $t_1$ and $t_2$, the object extraction engine 600 creates the camera matricies K1, R1, T1 and K2, R2, T2, respectively referring to the K matrix, rotation matrix R, and the translation matrix T. In addition, operation 820 yields flow fields that map, for example, pixel p1(x1,y1) in frame $t_1$ to pixel p2(x2,y2) in frame $t_2$. With this data, the method 800 then computes P(X, Y, Z), which is the 3D point that projects into p1 and p2, as well as C(xc, yc, zc), which represents the same 3D point, but represented in camera coordinates. Since p1 and p2 are the observed projection of P(X, Y, Z), then:

$$P=R*C+T,$$

where R is the rotation matrix and T is the translation matrix of the camera. Expanding the element multiplation yields:

$$xc1=R1.r11*X+R1.r12*Y+R1.r13*Z+T1.tx;$$

$$yc1=R1.r21*X+R1.r22*Y+R1.r23*Z+T1.ty;$$

$$zc1=R1.r31*X+R1.r32*Y+R1.r33*Z+T1.tz; \quad (11)$$

$$xc2=R2.r11*X+R2.r12*Y+R2.r13*Z+T2.tx;$$

$$yc2=R2.r21*X+R2.r22*Y+R2.r23*Z+T2.ty;$$

$$zc2=R2.r31*X+R2.r32*Y+R2.r33*Z+T2.tz;$$

as well as:

$$x1 = K1 \cdot k11 * \frac{xc1}{zc1};$$

$$y1 = K1 \cdot k11 * \frac{yc1}{zc1};$$

$$x2 = K2 \cdot k11 * \frac{xc2}{zc2};$$

$$y2 = K2 \cdot k11 * \frac{yc2}{zc2}.$$

By performing an inverse perspective projection, the following relationships between (X, Y, Z) and (x1, y1) is obtained:

$$X=A1*Z+B1; \quad (12)$$

$$Y=A2*Z+B2; \quad (13)$$

where:

$$A1=((R1.r12*R1.r33-R1.r13*R1.r32)*y1+ \\ (R1.r23*R1.r32-R1.r22*R1.r33)*x1- \\ (K1.k11*R1.r12*R1.r23)+ \\ (K1.k11*R1.r13*R1.r22))\div D1;$$

$$B1=((R1.r12*T1.tz-R1.r32*T1.tx)*y1+ \\ (R1.r32*T1.ty-R1.r22*T1.tz)*x1- \\ (K1.k11*R1.r12*T1.ty)+(K1.k11*R1.r22*T1.tx)) \\ \div D1;$$

$$A2=((R1.r11*R1.r33-R1.r13*R1.r31)*y1+ \\ (R1.r23*R1.r31-R1.r21*R1.r33)*x1- \\ (K1.k11*R1.r11*R1.r23)+ \\ (K1.k11*R1.r13*R1.r21))\div D1;$$

$$B2=((R1.r11*T1.tz-R1.r31*T1.tx)*y1+(R1.r31*T1.ty- \\ R1.r21*T1.tz)*x1-(K1.k11*R1.r11*T1.ty)+ \\ (K1.k11*R1.r21*T1.tx))\div D1;$$

and where:

$$D1=((R1.r11*R1.r32-R1.r12*R1.r31)*y1+ \\ (R1.r22*R1.r31-R1.r21*R1.r32)*x1- \\ (K1.k11*R1.r11*R1.r22)+ \\ (K1.k11*R1.r12*R1.r21)).$$

Similarly, for (X, Y, Z) and (x2, y2):

$$X=A3*Z+B3;$$

$$Y=A4*Z+B4;$$

where:

$$A3=((R2.r12*R2.r33-R2.r13*R2.r32)*y2+ \\ (R2.r23*R2.r32-R2.r22*R2.r33)*x2- \\ (K2.k11*R2.r12*R2.r23)+ \\ (K2.k11*R2.r13*R2.r22))\div D2;$$

$$B3=((R2.r12*T2.tz-R2.r32*T2.tx)*y2+ \\ (R2.r32*T2.ty-R2.r22*T2.tz)*x2- \\ (K2.k11*R2.r12*T2.ty)+(K2.k11*R2.r22*T2.tx)) \\ \div D2;$$

$$A4=((R2.r11*R2.r33-R2.r13*R2.r31)*y2+ \\ (R2.r23*R2.r31-R2.r21*R2.r33)*x2- \\ (K2.k11*R2.r11*R2.r23)+ \\ (K2.k11*R2.r13*R2.r21))\div D2;$$

$$B4=((R2.r11*T2.tz-R2.r31*T2.tx)*y2+(R2.r31*T2.ty- \\ R2.r21*T2.tz)*x2-(K2.k11*R2.r11*T2.ty)+ \\ (K2.k11*R2.r21*T2.tx))\div D2;$$

and where:

$$D2=((R2.r11*R2.r32-R2.r12*R2.r31)*y2+ \\ (R2.r22*R2.r31-R2.r21*R2.r32)*x2- \\ (K2.k11*R2.r11*R2.r22)+ \\ (K2.k11*R2.r12*R2.r21)).$$

The above presents a set of four linear equations in three unknowns:

$$A*P=B,$$

with:

$$A=\{\{1,0,-A1\},\{0,1,-A2\},\{1,0,-A3\},\{0,1,-A4\}\},$$

and:

$$B=\{B1,B2,B3,B4\}.$$

The object extraction engine 600 solves this system with least squares using the generalized inverse method:

$$P=Ag*B,$$

where:

$$Ag=\text{Transp}(A)*\text{Inverse}(A*\text{Transp}(A)).$$

Once the object extraction engine 600 has determined P(X, Y, Z), the object extraction engine applies equation (11) to obtain zc1, the depth value p1(x1, y1). This process is repeated for each pixel in frame $t_1$, and for each frame in the sequence. Some known systems use a "stereo" technique, which rectifies the image pair, computes a disparity map on the rectified pair, and converts the disparity to depth using basic mathematics. However, the stereo technique may fail. The method described above is more robust, and enables a full estimation of the camera parameters, including the focal, and may run in real time (e.g., at interactive rates) on existing computing hardware.

At operation 860, the object extraction engine 600 determines an average depth value for each pixel in the current frame. The object extraction engine 600 may use n frames from before and after the current frame to calculate the weighted average of the corresponding pixels in those frames to determine the average depth value. For the weighted average, the weight is usually heavier for pixels nearer the center and drops if the object moves to the edges. At operation 870, the object extraction engine 600 carves a mesh using the depth map to form and extract shapes from the depth values.

Figure 9:
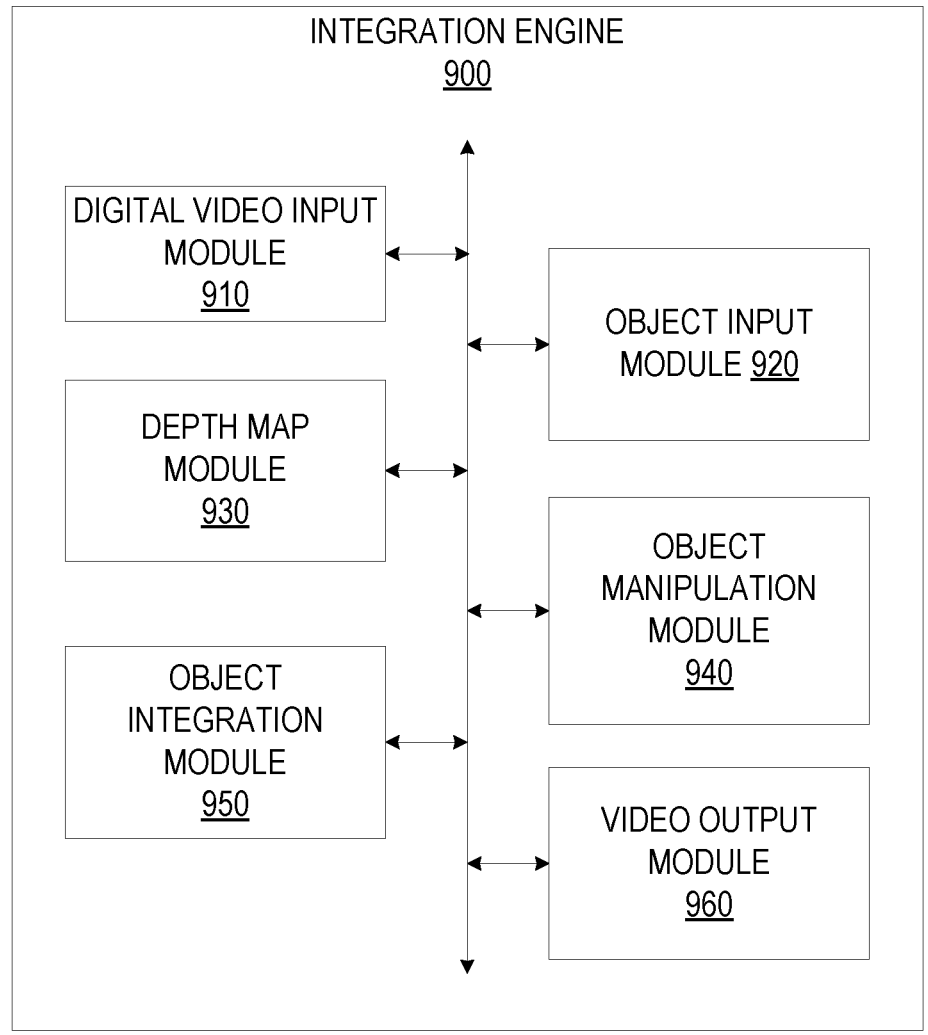
FIG. 9 is a block diagram showing components provided within an integration engine, according to some embodiments.

FIG. 9 is a block diagram showing components provided within an integration engine 900, according to some embodiments. In some embodiments, the integration engine 900 may be similar to the integration engine 416. In the example embodiment, the integration engine 900 alters or augments a source digital video to, for example, integrate additional objects (e.g., add one or more 3D objects into the scene), or manipulate objects within the source digital video (e.g., modify objects already present in the scene), to generate an augmented digital video. The integration engine 900 may be a part of a mobile computing device such as the OHMD device 120, or may be on a desktop device (e.g., personal computer or server machine(s) (not shown)) or a server device (e.g., a cloud server), and may be similar to the graphics processing engine 150. Further, components of the integration engine 900 may be similar to components of the path extraction engine 412, and the integration engine 900 may be used in conjunction with the path extraction engine 412 and/or the object extraction engine 600. For example, the integration engine 900 may be combined with the path extraction engine 412 and the object extraction engine 600 to form a combined device or system (not separately shown) for performing each of their respective operations, either independently or in conjunction.

The integration engine 900 includes a digital video input module 910, an object input module 920, a depth map module 930, an object manipulation module 940, an object integration module 950, and a video output module 960. The modules themselves are communicatively coupled (e.g., via appropriate interfaces) to each other and to various data sources, so as to allow information to be passed among the modules, or so as to allow the modules to share and access common data. The digital video input module 910 may be similar to the digital video input modules 410 and/or 610, and the depth map module 930 may be similar to the depth map module 630.

The digital video input module 910 receives the source digital video. In some embodiments, the source digital video may be provided by the OHMD device 120, the path extraction engine 412, or the object extraction engine 600. In other embodiments, the source digital video may be provided by a user, such as a game developer or a video editor. The object input module 920 may receive one or more objects such as, for example, 3D object definitions of objects to be integrated into the scene by the integration engine 900. The objects may be provided by the user, such as the game developer or the video editor, or may be provided by the object extraction engine 600. The depth map module 930 may receive depth map information associated with objects and/or the source digital video. The depth map information may be provided by the user, or by the object extraction engine 600, and may include information from the camera 130.

The object manipulation module 940 alters, modifies, or manipulates the scene within the source digital video. This may include, for example, manipulation of the depth map information or manipulation of the objects. In some embodiments, the objects extracted from the depth map may be manipulated by adjusting the depth values associated with the object volume. In other words, the object volume may be sculpted through alterations to the depth map. The manipulation may be done from within a camera view and with the use of some user interface mechanisms. For example, the user may push or pull the pixels within the depth map that corresponds to the boundary of the object volume, thereby effecting changes to the shape of the object. Since each pixel in a particular frame corresponds to a point on the object, the integration engine 900 may then make a change in depth for that pixel in other frames (e.g., using the techniques for feature tracking described above in relation to the path extraction engine 400).

The object integration module 950 augments the scene within the source digital video by adding additional objects into the scene. In some embodiments, objects that are extracted from the depth map allow for deep integration of new 3D objects with the original 2D video source background. For example, presume that the table 210 is extracted from the depth map created from the source digital video. Since the table 210 is an extracted, independent object, the integration engine 900 may introduce other objects into the scene (e.g., into one or more frames) by, for example, rendering the new objects relative to the existing objects, and/or relative to the camera path 702.

The object manipulation module 940 and/or the object integration module 950 may perform additional alterations based on the other intergrations and manipulations described above. For example, since new objects may have been added to the scene, the integration engine 900 may effect certain interactions within the scene, such as among objects within each frame. Lighting may be altered based on the objects (e.g., the newly added object may be placed upon the table surface 212 and may cast a shadow onto the table surface 212). Physics rules may be imparted to the objects (e.g., the new object may have a motion imparted such that it rolls across or bounces upon the table surface 212).

The video output module 960 generates the augmented video digital video that includes the integrated and/or manipulated objects within the scene. In other words, the integration or modification of the objects allows the original source video to include the newly added or manipulated objects, for example, to look as if they were a part of the original video.

Figure 10:
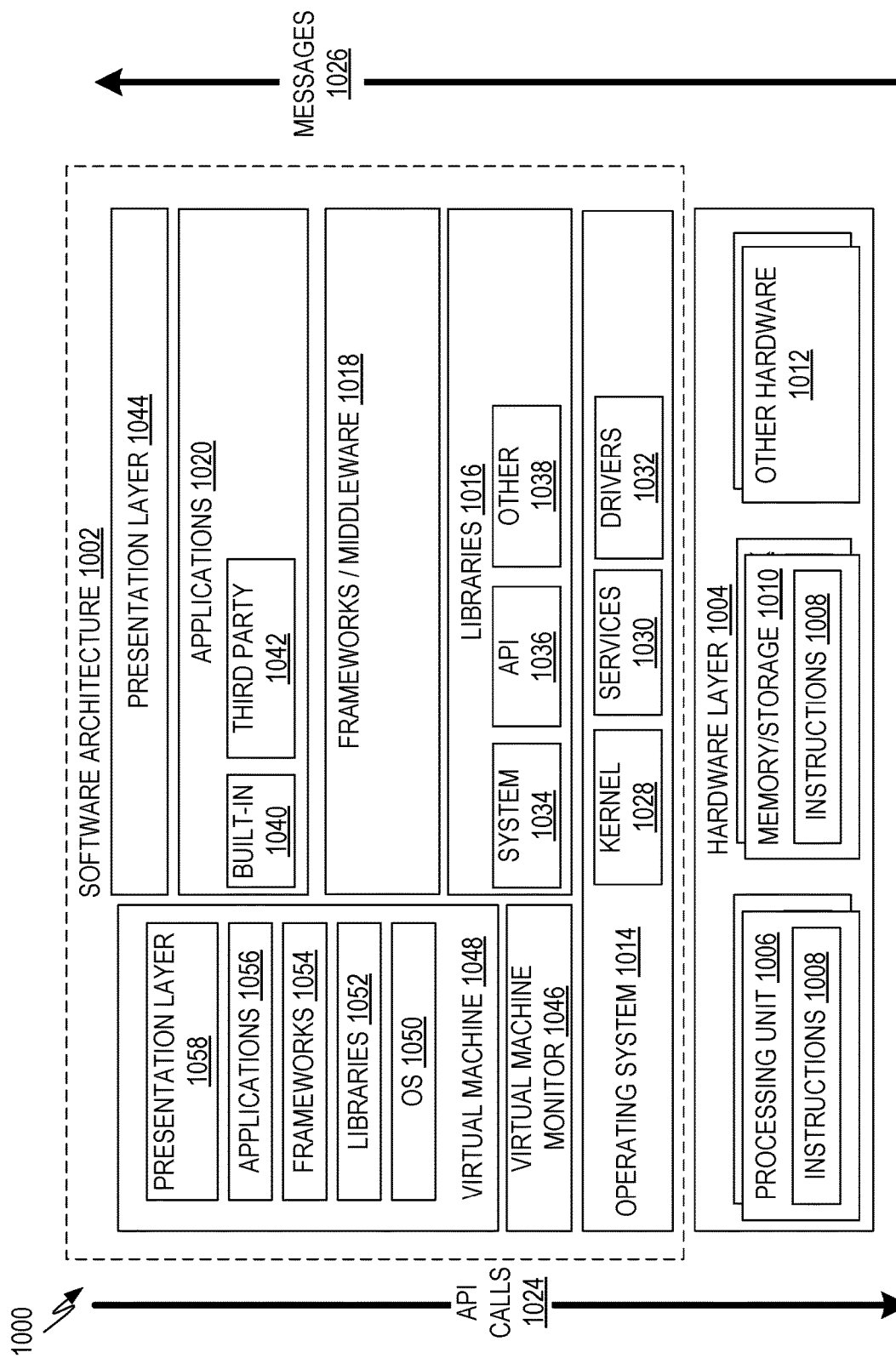
FIG. 10 is a block diagram illustrating an example software architecture, which may be used in conjunction with various hardware architectures herein described.

FIG. 10 is a block diagram illustrating an example software architecture 1002, which may be used in conjunction with various hardware architectures herein described. FIG. 10 is a non-limiting example of a software architecture and it will be appreciated that many other architectures may be implemented to facilitate the functionality described herein. The software architecture 1002 may execute on hardware such as machine 1100 of FIG. 11 that includes, among other things, processors 1110, memory 1130, and input/output (I/O) components 1150. A representative hardware layer 1004 is illustrated and can represent, for example, the a machine 1100 of FIG. 11. The representative hardware layer 1004 includes a processing unit 1006 having associated executable instructions 1008. The executable instructions 1008 represent the executable instructions of the software architecture 1002, including implementation of the methods, modules and so forth described herein. The hardware layer 1004 also includes memory and/or storage modules shown as memory/storage 1010, which also have the executable instructions 1008. The hardware layer 1004 may also comprise other hardware 1012.

In the example architecture of FIG. 10, the software architecture 1002 may be conceptualized as a stack of layers where each layer provides particular functionality. For example, the software architecture 1002 may include layers such as an operating system 1014, libraries 1016, frameworks or middleware 1018, applications 1020 and a presentation layer 1044. Operationally, the applications 1020 and/or other components within the layers may invoke application programming interface (API) calls 1024 through the software stack and receive a response as messages 1026. The layers illustrated are representative in nature and not all software architectures have all layers. For example, some mobile or special purpose operating systems may not provide the frameworks/middleware 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be used by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) provide a higher-level common infrastructure that may be used by the applications 1020 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be used by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1042 may invoke the API calls 1024 provided by the mobile operating system such as the operating system 1014 to facilitate functionality described herein.

The applications 1020 may use built-in operating system functions (e.g., kernel 1028, services 1030, and/or drivers 1032), libraries 1016, or frameworks/middleware 1018 to create user interfaces to interact with users of the system. Alternatively, or additionally, in some systems interactions with a user may occur through a presentation layer, such as the presentation layer 1044. In these systems, the application/module "logic" can be separated from the aspects of the application/module that interact with a user.

Some software architectures use virtual machines. In the example of FIG. 10, this is illustrated by a virtual machine 1048. The virtual machine 1048 creates a software environment where applications/modules can execute as if they were executing on a hardware machine (such as the machine 1100 of FIG. 11, for example). The virtual machine 1048 is hosted by a host operating system (e.g., operating system 1014 in FIG. 10) and typically, although not always, has a virtual machine monitor 1046, which manages the operation of the virtual machine 1048 as well as the interface with the host operating system (e.g., operating system 1014). A software architecture executes within the virtual machine 1048 such as an operating system (OS) 1050, libraries 1052, frameworks 1054, applications 1056, and/or a presentation layer 1058. These layers of software architecture executing within the virtual machine 1048 can be the same as corresponding layers previously described or may be different.

Figure 11:
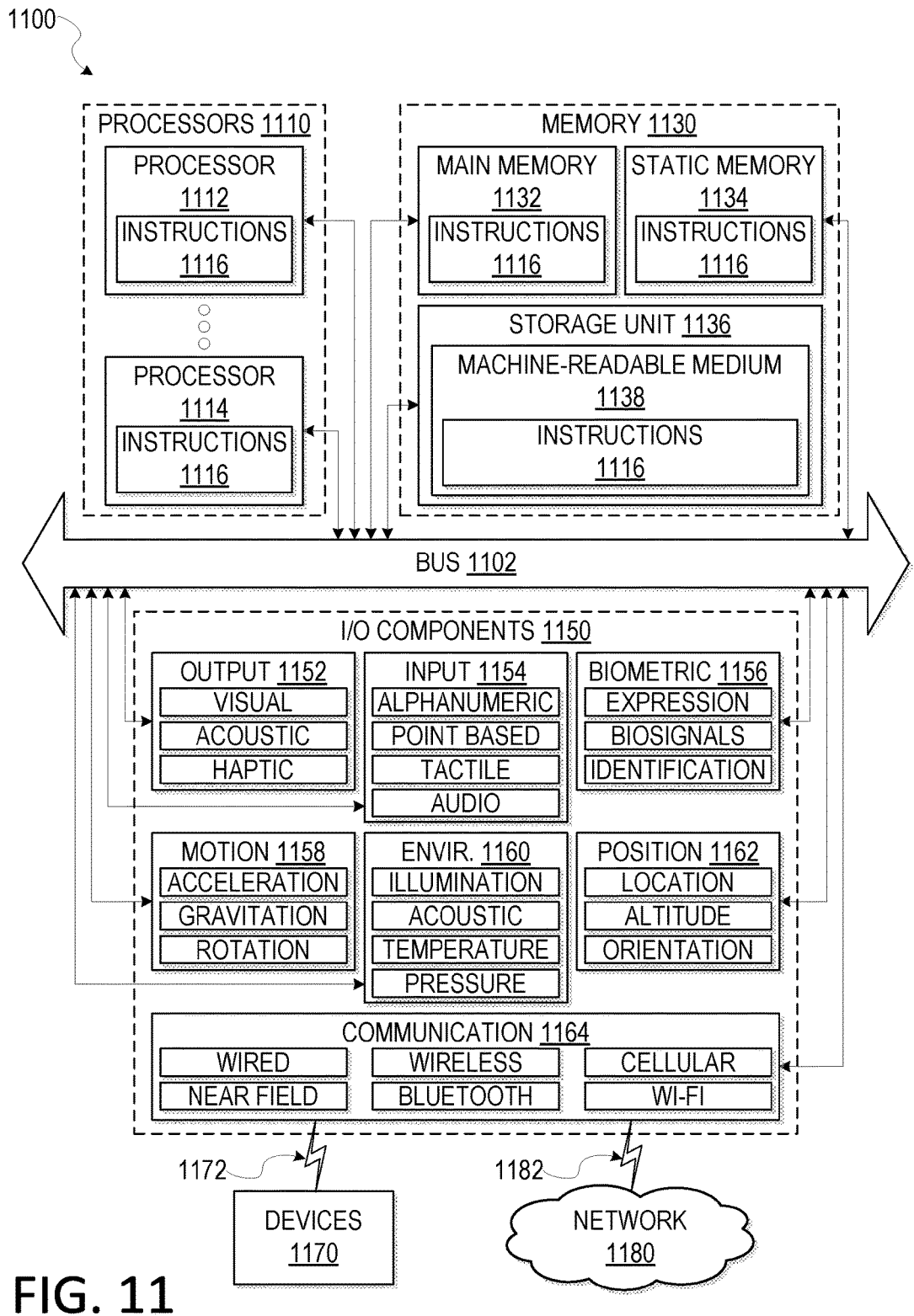
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. As such, the instructions 1116 may be used to implement modules or components described herein. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines that individually or jointly execute the instructions 1116 to perform any one or more of the methodologies discussed herein.

The machine 1100 may include processors 1110, memory 1130, and input/output (I/O) components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory 1130 may include a memory, such as a main memory 1132, a static memory 1134, or other memory storage, and a storage unit 1136, both accessible to the processors 1110 such as via the bus 1102. The storage unit 1136 and memory 1132, 1134 store the instructions 1116 embodying any one or more of the methodologies or functions described herein. The instructions 1116 may also reside, completely or partially, within the memory 1132, 1134, within the storage unit 1136, within at least one of the processors 1110 (e.g., within the processor's cache memory), or any suitable combination thereof, during execution thereof by the machine 1100. Accordingly, the memory 1132, 1134, the storage unit 1136, and the memory of processors 1110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1150 may include a wide variety of components to receive input, provide output, produce output, transmit information, exchange information, capture measurements, and so on. The specific input/output (I/O) components 1150 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1150 may include many other components that are not shown in FIG. 11. The input/output (I/O) components 1150 are grouped according to functionality merely for simplifying the following discussion and the grouping is in no way limiting. In various example embodiments, the input/output (I/O) components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the input/output (I/O) components 1150 may include biometric components 1156, motion components 1158, environment components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental environment components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1150 may include communication components 1164 operable to couple the machine 1100 to a network 1180 or devices 1170 via a coupling 1182 and a coupling 1172 respectively. For example, the communication components 1164 may include a network interface component or other suitable device to interface with the network 1180. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF 417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more hardware processors;
   a head mounted display (HMD) configured to display a virtual environment to a user wearing the HMD;
   a digital camera device configured to capture digital video; and
   an object extraction engine, executable by the one or more hardware processors, configured to perform operations for determining a depth map for a two-dimensional (2D) video, the operations comprising:
   receiving the 2D video from the digital camera device, the 2D video presenting a 2D view of a three-dimensional environment surrounding the HMD, the digital camera device moving along a camera path in the 3D environment as the digital camera device captures the 2D video;
   using the 2D video to calculate in real time a camera path motion including a camera K matrix, rotation matrix R, and translation matrix T, as the digital camera device moves along the camera path;
   computing optical flow of pixels from a frame to the next frame for pixels and for frames in the 2D video;
   using the optical flow to map a pixel in the first frame to a pixel in a second frame, where the first frame and the second frame are consecutive frames, and defining coordinates for a 3D point in the environment using world coordinates (P) and camera coordinates (C) whereby the 3D point projects into both the pixel in the first frame and the pixel in the second frame;
   using a matrix relation and the camera matrix K, to relate the depth value of the camera coordinates to the world coordinates and the camera path motion;
   determining the coordinates for point P, and using the matrix relation to calculate the depth of the point P in camera coordinates.

2. The system of claim 1, wherein the matrix relation is P=R*C+T.

3. The system of claim 1, wherein the determining of the coordinates of the 3D point in world coordinates includes solving four linear equations that define a relationship between coordinates for the 3D point and coordinates of the pixel in the first frame and coordinates of the pixel in the second frame.

4. The system of claim 3, wherein the four linear equations are obtained by performing an inverse perspective projection on the 3D point.

5. The system of claim 1, wherein the HMD contains motion sensors and the camera path motion is calculated with sensor data from the motion sensors.

6. The system of claim 1, the operations further comprising computing an average depth map for a frame based on a moving window of frames of the 2D video in the neighborhood of the frame, wherein an average depth value for each pixel in the frame is calculated using depth values for associated pixels from adjacent frames in the window, wherein the associated pixels are determined using the optical flow to track pixels that correspond to the same 3D point across different frames in the window.

7. The system of claim 6, wherein the average value for a pixel is calculated with larger weights given to associated pixels with coordinates closer to the center of the frame.

8. The system of claim 1, wherein the 2D video is a video stream and the operations for determining a depth map are done on the leading edge of the video stream in real-time as the stream is generated.

9. A method comprising:
performing operations for determining a depth map for a two-dimensional (2D) video, the operations comprising:
receiving the 2D video from the digital camera device, the 2D video presenting a 2D view of a three-dimensional environment surrounding a head mounted display (HMD), the digital camera device moving along a camera path in the 3D environment as the digital camera device captures the 2D video;
using the 2D video to calculate in real time a camera path motion including a camera K matrix, rotation matrix R, and translation matrix T, as the digital camera device moves along the camera path;
computing optical flow of pixels from a frame to the next frame for pixels and for frames in the 2D video;
using the optical flow to map a pixel in the first frame to a pixel in a second frame, where the first frame and the second frame are consecutive frames, and defining coordinates for a 3D point in the environment using world coordinates (P) and camera coordinates (C) whereby the 3D point projects into both the pixel in the first frame and the pixel in the second frame;
using a matrix relation and the camera matrix K, to relate the depth value of the camera coordinates to the world coordinates and the camera path motion;
determining the coordinates for point P, and using the matrix relation to calculate the depth of the point P in camera coordinates.

10. The method of claim 9, wherein the matrix relation is P=R*C+T.

11. The method of claim 9, wherein the determining of the coordinates of the 3D point in world coordinates includes solving four linear equations that define a relationship between coordinates for the 3D point and coordinates of the pixel in the first frame and coordinates of the pixel in the second frame.

12. The method of claim 11, wherein the four linear equations are obtained by performing an inverse perspective projection on the 3D point.

13. The method of claim 9, wherein the HMD contains motion sensors and the camera path motion is calculated with sensor data from the motion sensors.

14. The method of claim 9, the operations further comprising computing an average depth map for a frame based on a moving window of frames of the 2D video in the neighborhood of the frame, wherein an average depth value for each pixel in the frame is calculated using depth values for associated pixels from adjacent frames in the window, wherein the associated pixels are determined using the optical flow to track pixels that correspond to the same 3D point across different frames in the window.

15. The method of claim 14, wherein the average value for a pixel is calculated with larger weights given to associated pixels with coordinates closer to the center of the frame.

16. The method of claim 9, wherein the 2D video is a video stream and the operations for determining a depth map are done on the leading edge of the video stream in real-time as the stream is generated.

17. A non-transitory machine-readable storage medium including a set of instructions, the set of instructions configuring one or more processors to perform operations for determining a depth map for a two-dimensional (2D) video, the operations comprising:
receiving the 2D video from the digital camera device, the 2D video presenting a 2D view of a three-dimensional environment surrounding a head mounted display (HMD), the digital camera device moving along a camera path in the 3D environment as the digital camera device captures the 2D video;
using the 2D video to calculate in real time a camera path motion including a camera K matrix, rotation matrix R, and translation matrix T, as the digital camera device moves along the camera path;
computing optical flow of pixels from a frame to the next frame for pixels and for frames in the 2D video;
using the optical flow to map a pixel in the first frame to a pixel in a second frame, where the first frame and the second frame are consecutive frames, and defining coordinates for a 3D point in the environment using world coordinates (P) and camera coordinates (C) whereby the 3D point projects into both the pixel in the first frame and the pixel in the second frame;
using a matrix relation and the camera matrix K, to relate the depth value of the camera coordinates to the world coordinates and the camera path motion;
determining the coordinates for point P, and using the matrix relation to calculate the depth of the point P in camera coordinates.

18. The non-transitory machine-readable storage medium of claim 17, wherein the determining of the coordinates of the 3D point in world coordinates includes solving four linear equations that define a relationship between coordinates for the 3D point and coordinates of the pixel in the first frame and coordinates of the pixel in the second frame.

19. The non-transitory machine-readable storage medium of claim 17, the operations further comprising computing an average depth map for a frame based on a moving window of frames of the 2D video in the neighborhood of the frame, wherein an average depth value for each pixel in the frame is calculated using depth values for associated pixels from adjacent frames in the window, wherein the associated pixels are determined using the optical flow to track pixels that correspond to the same 3D point across different frames in the window.

20. The non-transitory machine-readable storage medium of claim 17, wherein the 2D video is a video stream and the operations for determining a depth map are done on the leading edge of the video stream in real-time as the stream is generated.

* * * * *